US012608686B2

(12) United States Patent
Jensen et al.

(10) Patent No.: US 12,608,686 B2
(45) Date of Patent: Apr. 21, 2026

(54) RECOMMENDING A REPAIR STEP TO PERFORM

(71) Applicant: Caterpillar Inc., Peoria, IL (US)

(72) Inventors: Taylor Jensen, Chicago, IL (US); Fiona J. O'Laughlin, East Peoria, IL (US); Diana E. Huerta, Chicago, IL (US); Christopher M. Burkard, Dunlap, IL (US); Christopher Ha, Champaign, IL (US); David Jason McIntyre, Peoria, IL (US); Torsten Van Wassenhove, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 97 days.

(21) Appl. No.: 18/541,512

(22) Filed: Dec. 15, 2023

(65) Prior Publication Data

US 2025/0200528 A1      Jun. 19, 2025

(51) Int. Cl.
G06Q 10/20           (2023.01)
(52) U.S. Cl.
CPC .................................... G06Q 10/20 (2013.01)
(58) Field of Classification Search
CPC .................... G06Q 20/00–425; H04L 9/00–50
See application file for complete search history.

(56) References Cited

U.S. PATENT DOCUMENTS

| | | | |
|---|---|---|---|
| 6,535,865 | B1 | 3/2003 | Skaaning et al. |
| 8,407,158 | B2 | 3/2013 | Suri et al. |
| 9,715,658 | B2 | 7/2017 | vanderZweep et al. |
| 10,747,559 | B2 | 8/2020 | Caldwell et al. |
| 10,901,834 | B2 | 1/2021 | Abhinav et al. |
| 11,543,250 | B2 | 1/2023 | Gardiner et al. |
| 11,556,902 | B2 | 1/2023 | Gulati et al. |
| 11,560,690 | B2 | 1/2023 | Halder et al. |

(Continued)

FOREIGN PATENT DOCUMENTS

| | | |
|---|---|---|
| CN | 110333987 B | 6/2020 |
| CN | 110119851 B | 11/2021 |

(Continued)

OTHER PUBLICATIONS

Written Opinion and International Search Report for Int'l. Patent Appln. No. PCT/US2024/056842, mailed Mar. 17, 2025 (15 pgs).

*Primary Examiner* — Ari Shahabi

(57) ABSTRACT

The system obtains a first representation of a troubleshooting guide associated with a first issue experienced by a first device. The first representation includes a first plurality of nodes and a first plurality of edges. A node indicates a troubleshooting procedure, and an edge indicates a result of the troubleshooting procedure, such as a testing step or repair step. The system determines a subset of the first plurality of edges indicating the repair step and converts the subset of the first plurality of edges into multiple repair nodes to obtain a second representation. A repair node indicates the repair step resolving the first issue. The second representation includes the first plurality of nodes and the multiple repair nodes. Based on the second representation, the system trains an artificial intelligence to provide a most likely repair step to resolve a second issue without requiring performance of the testing step.

20 Claims, 36 Drawing Sheets

(56)         References Cited

U.S. PATENT DOCUMENTS

|  |  |  |  |
|---|---|---|---|
| 11,586,488 | B2 | 2/2023 | Panda et al. |
| 11,656,595 | B2 | 5/2023 | Allison et al. |
| 2020/0327555 | A1 | 10/2020 | Sapoznik et al. |
| 2021/0004284 | A1* | 1/2021 | Vah ........................ G06N 20/20 |
| 2021/0026750 | A1* | 1/2021 | Shukla ................ G06F 11/3006 |
| 2021/0263792 | A1* | 8/2021 | Vah ........................ G06N 20/00 |
| 2022/0101148 | A1* | 3/2022 | Lin ........................ G06N 20/20 |
| 2022/0206481 | A1 | 6/2022 | Miller et al. |
| 2022/0220709 | A1 | 7/2022 | Kamon et al. |
| 2022/0382273 | A1 | 12/2022 | Otsuki |
| 2022/0407961 | A1 | 12/2022 | Willshire et al. |
| 2023/0083255 | A1 | 3/2023 | Ebrahimi et al. |
| 2023/0259821 | A1* | 8/2023 | Travalini ............ G06N 3/0455 |
|  |  |  | 706/12 |

FOREIGN PATENT DOCUMENTS

|  |  |  |  |
|---|---|---|---|
| CN | 114003466 | A | 2/2022 |
| CN | 114547282 | B | 9/2022 |
| CN | 114661885 | B | 10/2022 |
| CN | 115357700 | A | 11/2022 |
| CN | 114579824 | B | 5/2023 |

* cited by examiner

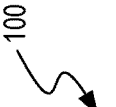
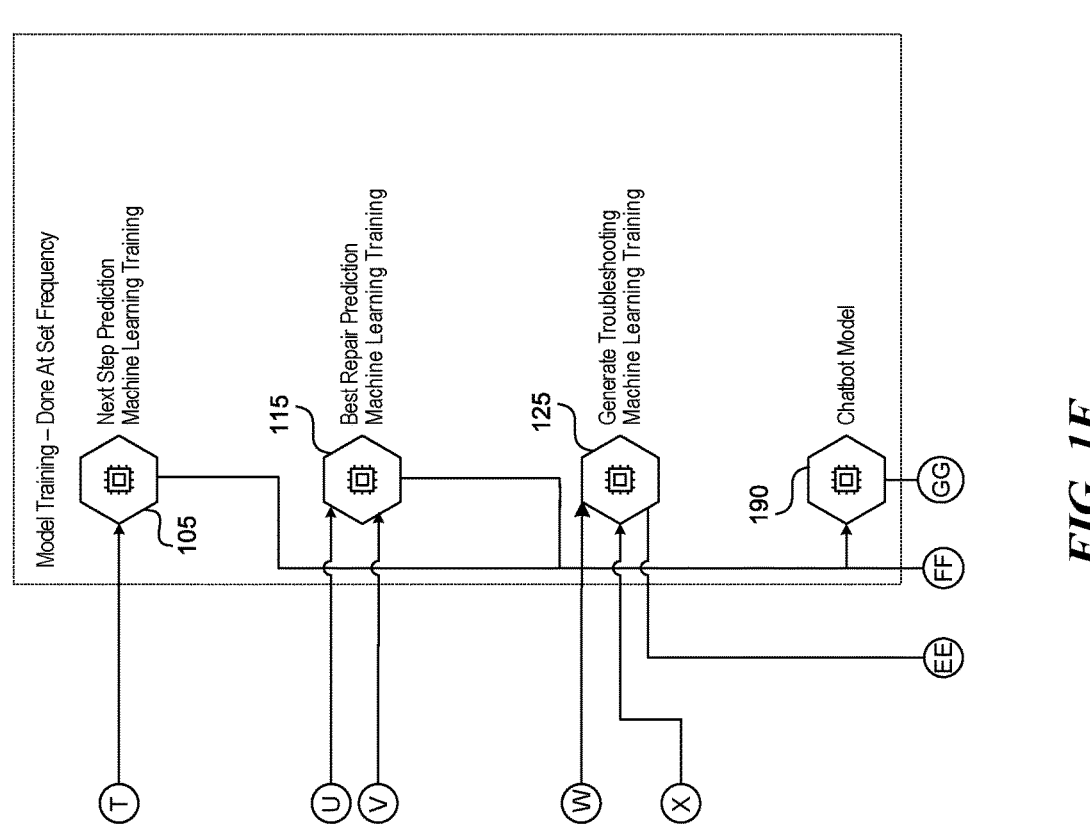
*FIG. 1E*

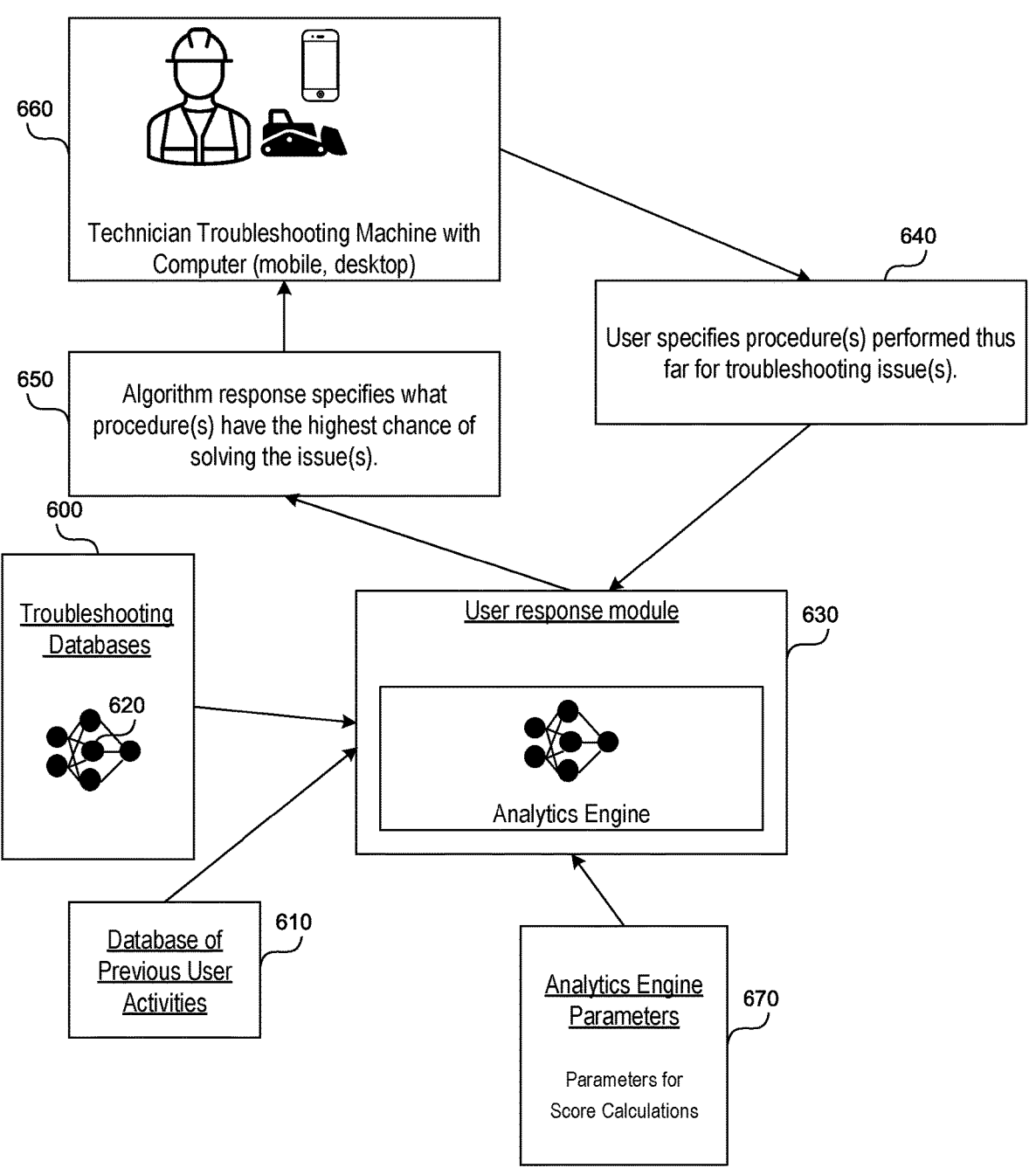

660

Technician Troubleshooting Machine with Computer (mobile, desktop)

640

User specifies procedure(s) performed thus far for troubleshooting issue(s).

650

Algorithm response specifies what procedure(s) have the highest chance of solving the issue(s).

600

Troubleshooting Databases

620

630

User response module

Analytics Engine

Database of Previous User Activities

610

Analytics Engine Parameters

670

Parameters for Score Calculations

*FIG. 6* step 700: Retrieve Specified Applicable Troubleshooting Trees

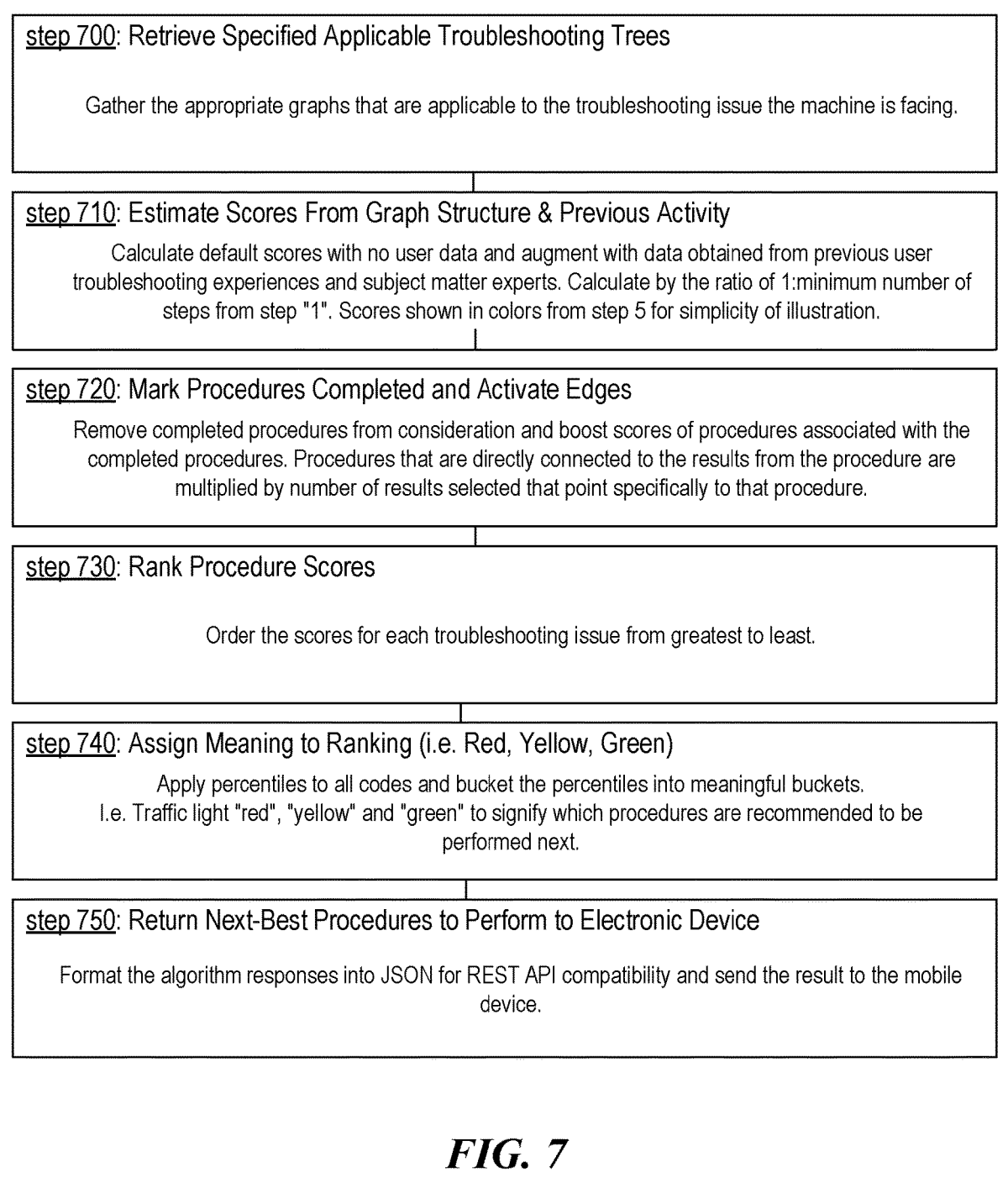

Gather the appropriate graphs that are applicable to the troubleshooting issue the machine is facing.

step 710: Estimate Scores From Graph Structure & Previous Activity

Calculate default scores with no user data and augment with data obtained from previous user troubleshooting experiences and subject matter experts. Calculate by the ratio of 1:minimum number of steps from step "1". Scores shown in colors from step 5 for simplicity of illustration.

step 720: Mark Procedures Completed and Activate Edges

Remove completed procedures from consideration and boost scores of procedures associated with the completed procedures. Procedures that are directly connected to the results from the procedure are multiplied by number of results selected that point specifically to that procedure.

step 730: Rank Procedure Scores

Order the scores for each troubleshooting issue from greatest to least.

step 740: Assign Meaning to Ranking (i.e. Red, Yellow, Green)

Apply percentiles to all codes and bucket the percentiles into meaningful buckets.
I.e. Traffic light "red", "yellow" and "green" to signify which procedures are recommended to be performed next.

step 750: Return Next-Best Procedures to Perform to Electronic Device

Format the algorithm responses into JSON for REST API compatibility and send the result to the mobile device.

*FIG. 7*

| Option ID | Default Score | Active Connections | Selected Connection Multiplier | Activity Adjusted Score | Percentile Ranking | Color |
|-----------|---------------|--------------------|--------------------------------|-------------------------|--------------------|-------|
| 3 | 25 | 0 / 1 | | 25 | 0-40 | |
| 4 | 100 | 0 / 1 | | 100 | 80-100 | |
| 5 | 33 | 0 / 2 | | 33 | 0-40 | |
| 6 | 50 | 0 / 2 | | 50 | 40-80 | |

□[31886, 31919],

□ Repair

RECOMMENDING A REPAIR STEP TO PERFORM

BACKGROUND

All electrical and mechanical products require maintenance and repair of failed parts and systems. Usually, owner's manuals and troubleshooting instructions are provided with such mechanical products, which illustrate how to diagnose and repair certain issues. In construction, energy, transportation, and mining equipment, multiple Engine/Electronic Control Modules (ECMs) generate Fault/Diagnostic Codes (DTCs) indicating that something has either failed or is about to fail. More recently, electronic manuals have been made available online, but these are typically tables and instructions hosted in a sequential format with distinct steps and procedures to diagnose and repair a problem. Such a guideline is a series of instructional options displayed in a sequential format on a website or in a mobile application where each instruction option can independently identify a root cause of the failure. This sequential approach means that to obtain a result, a user must follow each of the steps in sequence, even if it is not relevant to their actual troubleshooting process. In fact, most users attempt troubleshooting themselves before turning to a published guide. The sequential nature of these guides means that a user must repeat some troubleshooting steps that they may have already done. This leads to inefficiencies in the troubleshooting process, creates an ineffective system, and provides inconsistent results that cannot take into account the troubleshooting work a user has done in the past.

SUMMARY

The disclosed system streamlines and customizes users troubleshooting workflow so that the user does not spend time performing unnecessary steps and reading irrelevant voluminous troubleshooting documentation. The system enables the user to interact with the system through natural language, voice, text, touch, and click interfaces. The system uses artificial intelligence and machine learning to provide suggestions on which tests to perform to diagnose the issue and/or which repair steps to perform to fix the issue. The system can learn from multiple users' actions and experiences, and based on the learning, the system can recommend the most relevant test and/or repair.

BRIEF DESCRIPTION OF THE DRAWINGS

Detailed descriptions of implementations of the present invention will be described and explained through the use of the accompanying drawings.

FIGS. 1A-1E show an overview of the system to streamline a user's troubleshooting workflow and customize it to the user's experience, according to one embodiment.

FIG. 6 shows the details of the interaction between the analytics engine and the application.

FIG. 7 shows the details of the operation of the user response module.

FIG. 12 shows multiple paths extracted from the graph.

Figure 1A:
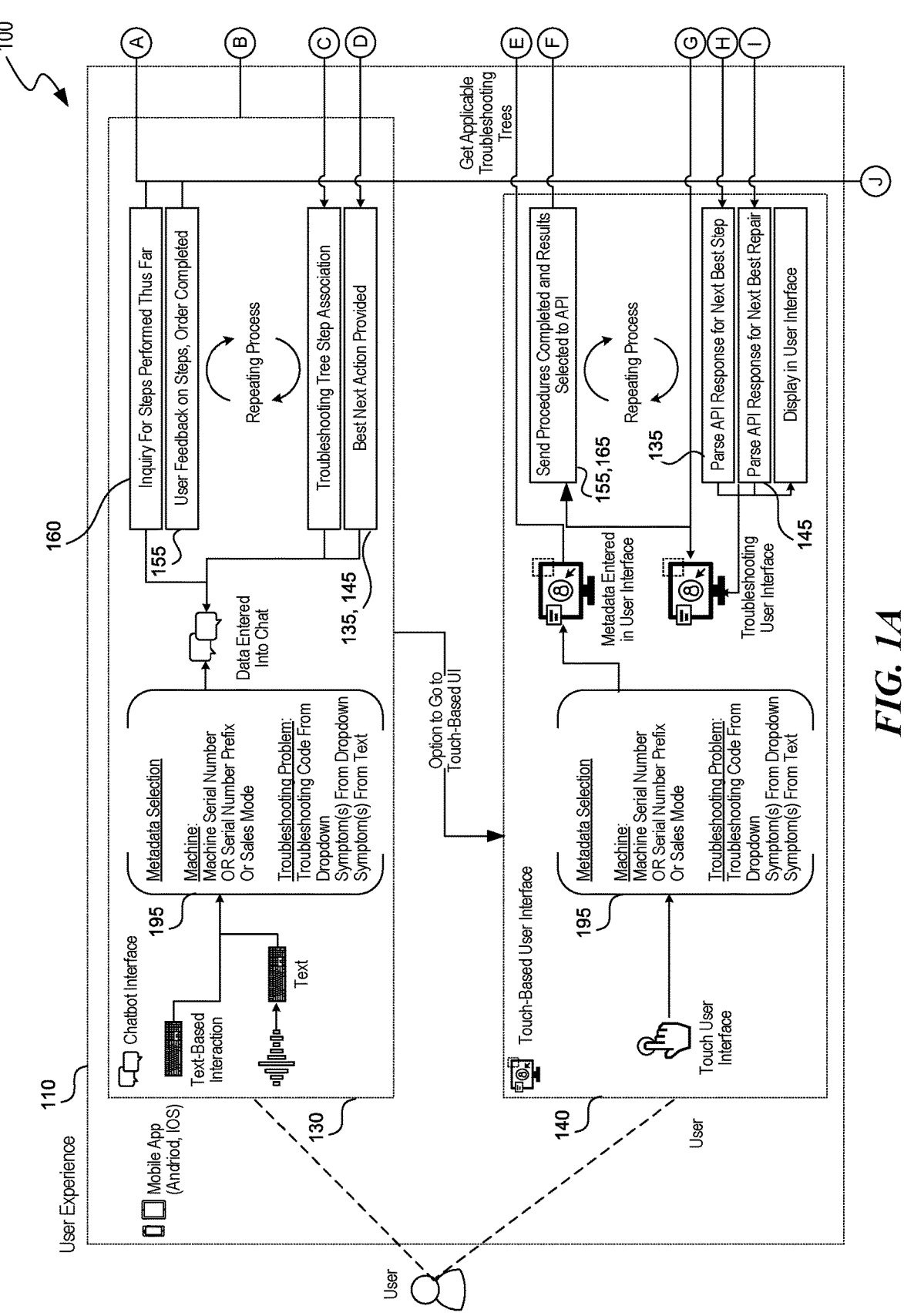
Figure 1B:
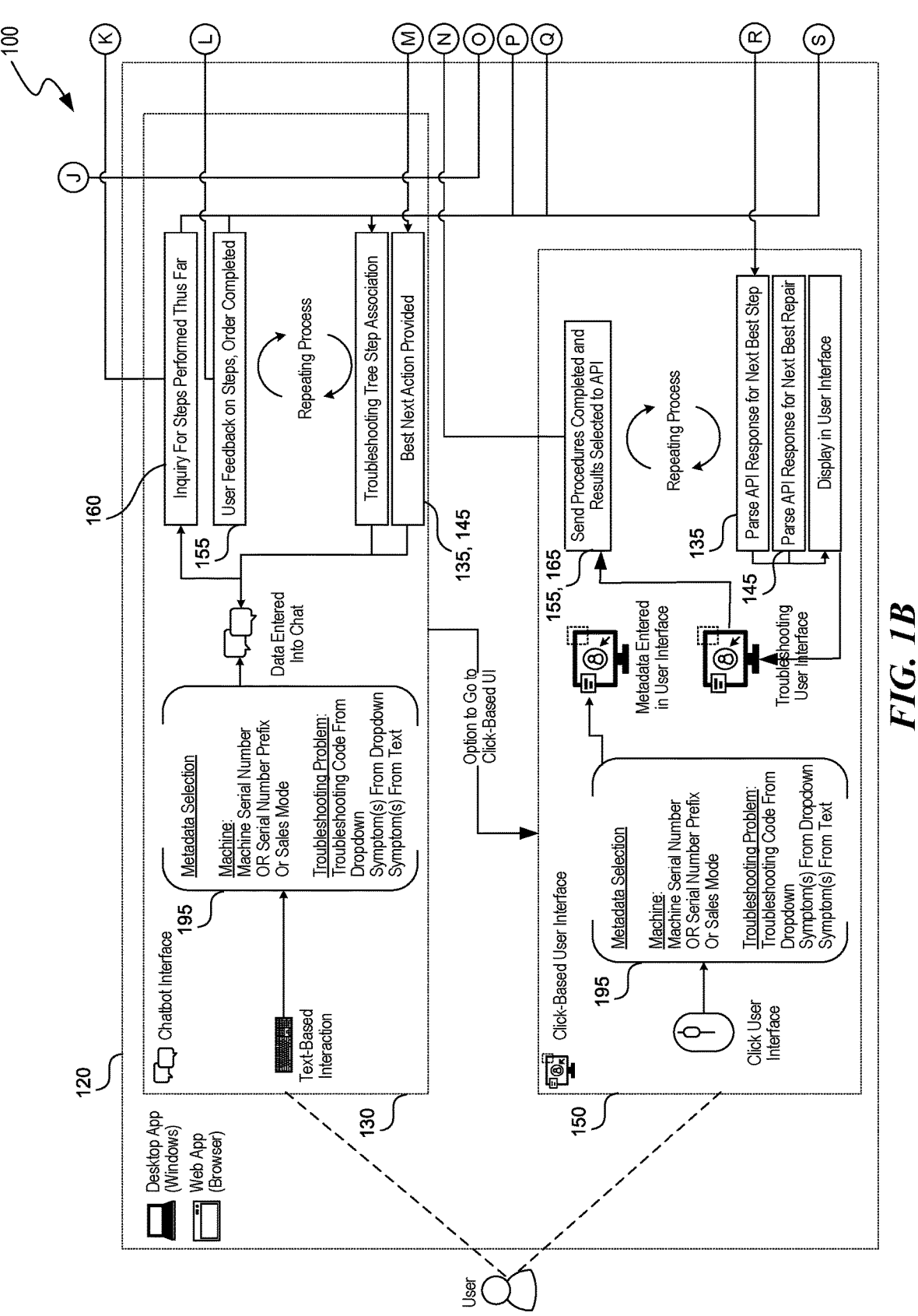
Figure 1C:
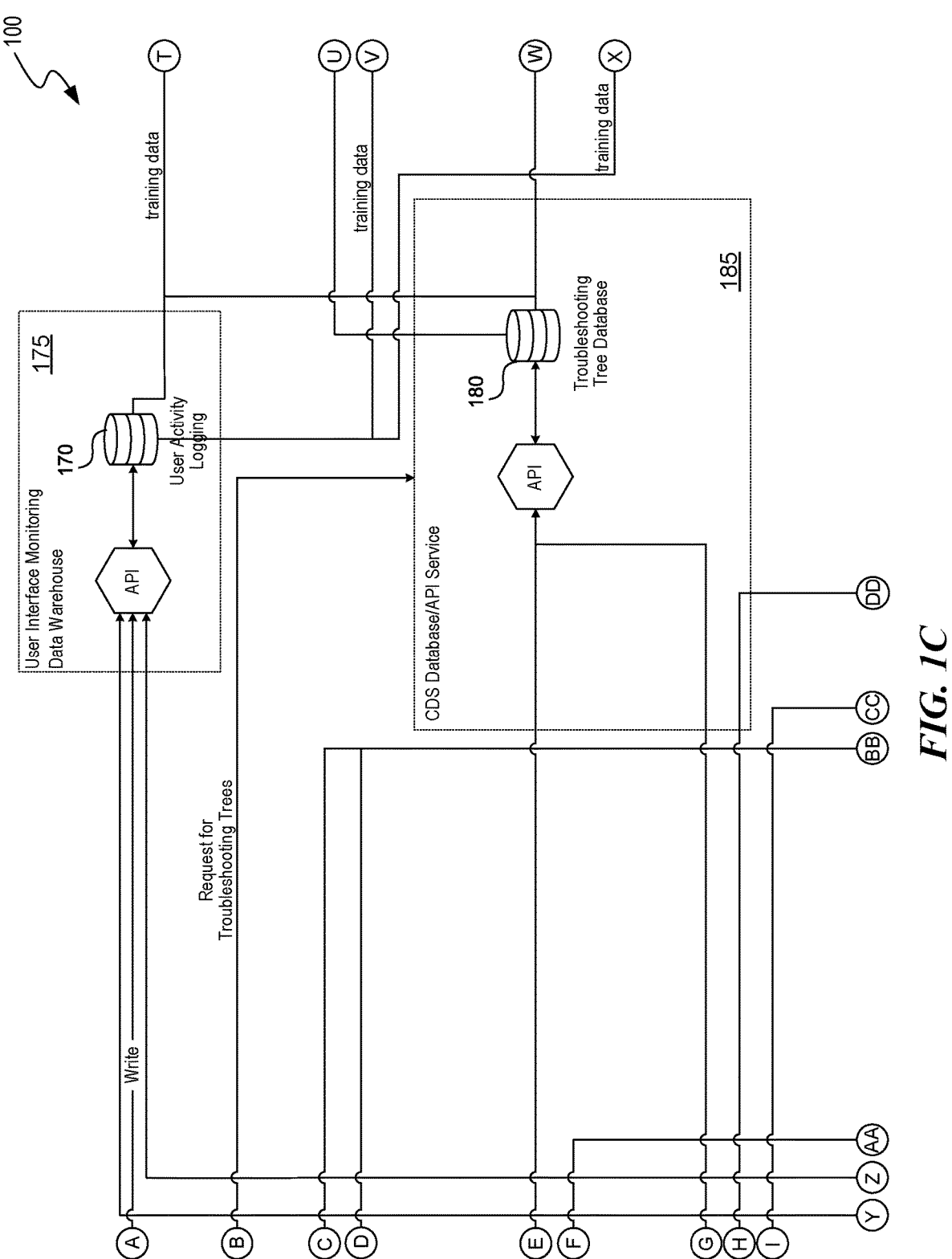
Figure 1D:
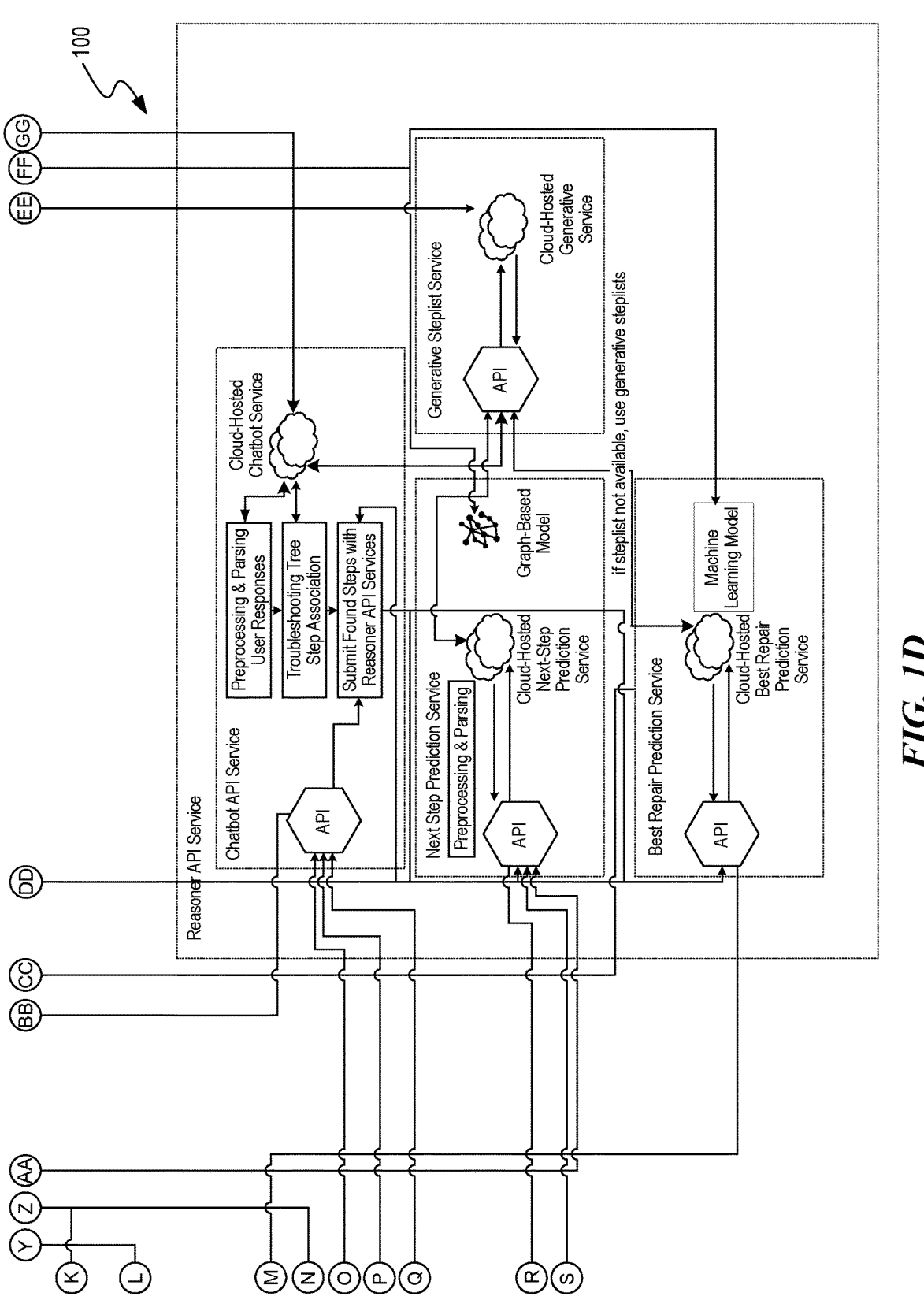

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples. Streamlining and Customizing User's Troubleshooting Workflow FIGS. 1A-1E show an overview of the system 100 to streamline a user's troubleshooting workflow and customize it to the user's experience, according to one embodiment. A user can interact with the system 100 using a user interface 110, 120. The user interface 110, 120 can run as a mobile application, a web browser interface, or a desktop application. The user can provide input through a chatbot interface 130, a touch-based interface 140, or a click-based user interface 150. The chatbot interface 130 can enable the user to enter input using text-based interaction or using voice to text. The chatbot interface 130 can be an interface to the chatbot model 190. Each user interface 130, 140, 150 receives the input from the user, and transfers the user input into a metadata 195.

The user input 160 can include a machine serial number of a machine experiencing an issue, a serial number prefix of the machine, or a make/model of the machine. In addition, the input 160 can include a troubleshooting code from a drop-down menu, one or more symptoms from a drop-down menu, or natural language describing symptoms. The machine can be a device, such as a vehicle, e.g., a heavy-duty vehicle, a computer, a chip, or any electronic device. The computer can include a server, a cloud computer, or a personal computer, including a mobile device, a tablet, or a built-in device.

The system 100 can store the user input 160 and other information about user interaction in a database 170. For example, the system can monitor how much time a particular user spends on a particular troubleshooting procedure and can store the measured time in the database 170.

In addition, the system 100 can store multiple troubleshooting procedures associated with various machines in the database 180. The multiple troubleshooting procedures can be stored as graphs where the initial node in the graph corresponds to the troubleshooting code, as described in this application. The system 100 can use various modules described in this application, such as next step prediction module 105, best repair prediction module 115, and/or generative step module 125 to provide a user with a troubleshooting procedure in step 135, 145. The troubleshooting procedure can include either a test 135 to perform on the machine or a repair 145 to perform on the machine.

The system 100 can suggest one or more troubleshooting procedures through the user interface 110, 120, 130. Upon performing a suggested troubleshooting procedure, the user can provide the input 165 including the results of the performed troubleshooting procedure to the system 100. In addition, the user can provide input 155 including the troubleshooting procedures completed so far and the order of the troubleshooting procedures. The system 100 can store the inputs 155, 165 in the database 170. Based on the inputs 155, 165, the system 100 can suggest the next best troubleshooting procedure in steps 135, 145 until the issue is resolved or the system 100 has no more suggestions.

The next step prediction module 105, best repair prediction module 115, generative step module 125, and/or the chatbot model 190 can be artificial intelligence (AI) and/or machine learning (ML) modules. The system 100 can gather data in the database 170 for multiple users and multiple users' interactions. The database 170 can be a part of the User Interface Monitoring Data Warehouse 175. The system 100 can use the user activity data stored in the database 170 and the troubleshooting procedures stored in the database 180 to train and retrain the modules 105, 115, 125, 190 at a predetermined frequency, such as once a month. The database 180 can be a part of the Common Data Service (CDS) Database/application programming interface (API) Service 185.

The system 100 can suggest the appropriate troubleshooting procedure to perform based on segmenting, e.g., grouping, multiple users. The system 100 can segment the users into groups based on user attributes such as time spent on troubleshooting procedures, demographic information such as age, gender, education, etc., and location. The location can indicate available equipment to test the machine having the issue. For example, users in Asia can have different equipment from users in Europe and different equipment from users in Africa. The system 100 can group the current user with a particular group and can suggest troubleshooting procedures that most frequently worked for the particular group in the past.

Figure 2:
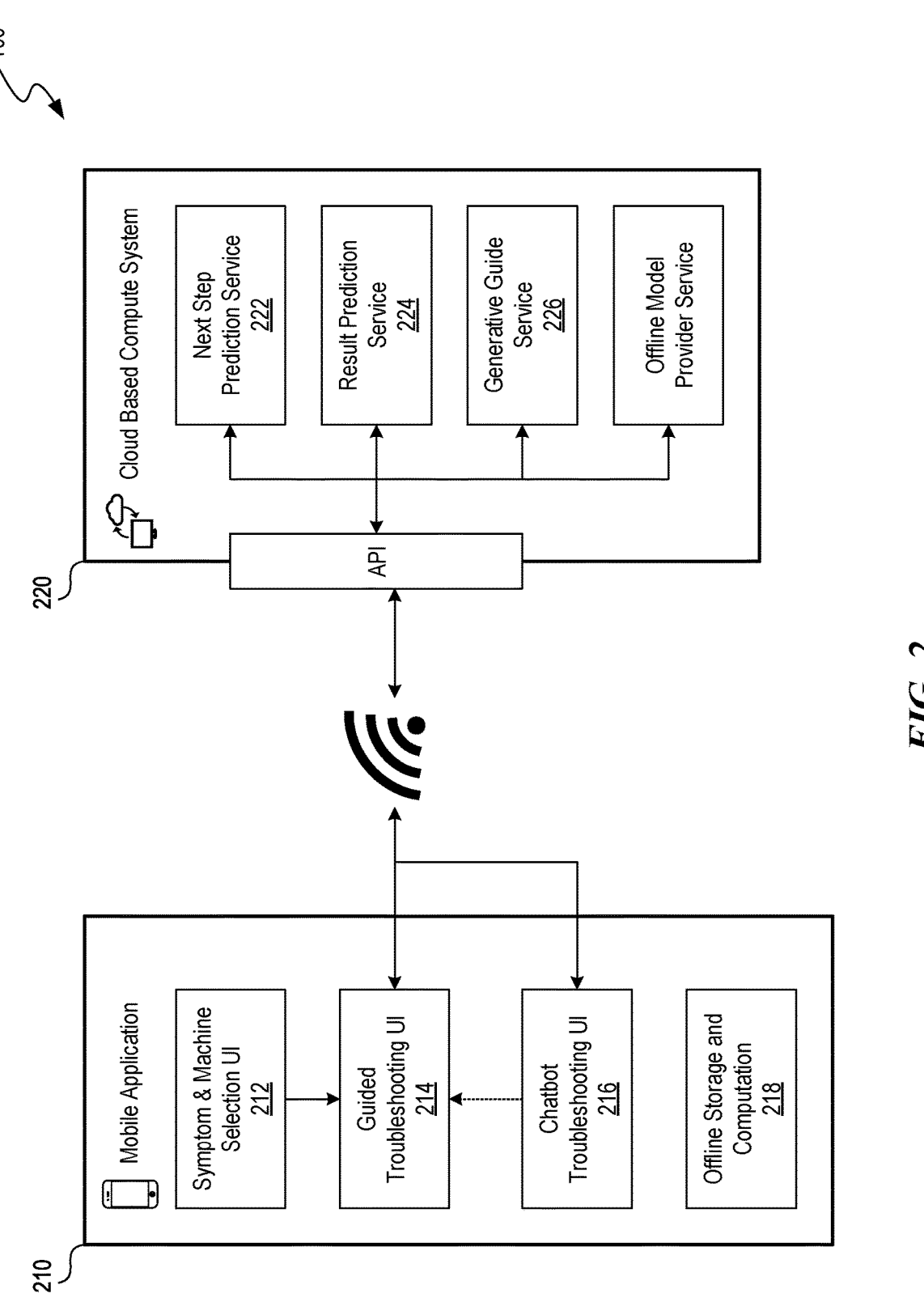
FIG. 2 shows an overview of the system to streamline a user's troubleshooting workflow and customize it to the user's experience, according to another embodiment.

FIG. 2 shows an overview of the system 100 to streamline a user's troubleshooting workflow and customize it to the user's experience, according to another embodiment. The system 100 includes user-facing application ("application") 210 and an analytics engine 220. The analytics engine 220 can run in a cloud-based computer system, or be transferred to the application 210, which can run as an online or offline application on desktop computers and mobile devices.

The application 210 includes symptom and machine selection user interface (UI) 212, guided troubleshooting UI 214, chatbot troubleshooting UI 216, and offline storage and computation 218. The symptom and machine selection UI 212 allows the user to select a machine experiencing the problem, and one or more issues with the machine, using either diagnostic trouble codes and/or non-sensor-based symptoms of the machine, such as inspection, noise, or visual. As a user starts a troubleshooting guideline session, the application 210 can automatically upload statistical data, e.g., session duration, success rate, etc., of the user's historical sessions and how they compare to the population of peers. The application 210 enables the user to save a troubleshooting session before completing the troubleshooting workflow so that the user can continue the troubleshooting session later.

After the user selects a code, the application 210, through the guided troubleshooting UI 214, can provide the user with the applicable troubleshooting procedures to diagnose the one or more problems. Each troubleshooting procedure has a "score" associated with it that signifies which procedure(s) are recommended to perform first. The "score" uses a special analytical algorithm described below. In addition to the "score," data is provided about the time, complexity, number of parts, and material costs required to perform each procedure, the history of troubleshooting for that particular user, as well as the statistics of what similar users (those of similar experience and role) have done in the past. When the user selects a procedure, the system 100 prompts the user to enter the result of the procedure, which can include things such as "voltage over 5 ohms" and "voltage under 5 ohms" as results. Once the user enters a result, the application 210 sends the data on which procedures were performed and their corresponding results to the analytics engine 220, which ranks and orders the remaining procedures to identify what procedure the user should perform next and provides a prediction on the repair that is most likely to solve the problem. This cycle continues until either all procedures are exhausted or the user resolves the issue, whichever comes first.

The analytics engine 220 is based on AI or an advanced analytics model and leverages the user's feedback, which eventually provides more consistent and higher-quality repair recommendations. Key user feedbacks of each session include but are not limited to time duration, success rate, difficulty, etc. These can be either calculated using a series of sequences and combinations of user clicks recorded in Google Analytics or statistics-based options manually selected by users. The repair recommendation can be based on segmenting the users into groups based on user attributes such as time spent on troubleshooting procedures, demographic information such as age, gender, education, etc., and location. The location can indicate available equipment to test the machine having the issue. For example, users in Asia can have different equipment from users in Europe and different equipment from users in Africa. The system 100 can group the current user with a particular group and can suggest troubleshooting procedures that most frequently worked for the particular group in the past.

The analytics engine 220 can include a next step prediction service 222, a result prediction service 224, and a generative guide service 226. The next step prediction service 222 can suggest the next best troubleshooting procedure, such as a next test to perform on the machine experiencing an issue. The system also predicts the next step based on the actions that the user has already performed and where no history is available, it recommends the most statistically useful procedure to start with. The next step prediction service 222 can be performed with a machine learning model as well as the generative step-list service and best repair prediction service.

The result prediction service 224 can suggest the next best troubleshooting procedure, e.g., a next repair to perform on the machine experiencing the issue. The generative guide service 226 can suggest the next best troubleshooting procedure, such as the next test or the next repair to perform for a machine for which there are no available troubleshooting procedures.

In addition to selecting the recommendations through manual clicks, the user also has the option to interact with the system 100 through a chatbot troubleshooting UI 216. In this case, the user provides the symptoms and troubleshooting codes the user is working to resolve via a natural language input provided to a chatbot troubleshooting UI 216. Once the symptoms are provided, chatbot troubleshooting UI 216 recognizes the symptoms and assigns them to the appropriate troubleshooting procedures and uses the analytics engine 220 to suggest the next best procedure to attempt. The user can then select the result of the procedure the user is attempting, and the diagnosis process would continue as described above, using a natural language-based interface. For example, the user can interact with the chatbot troubleshooting UI 216 using prompts such as: "Give me the 2 procedures that are less than 10 minutes to solve in total" or "Give me the fastest way to solve X problem," where X is a problem the user is experiencing.

Figure 3:
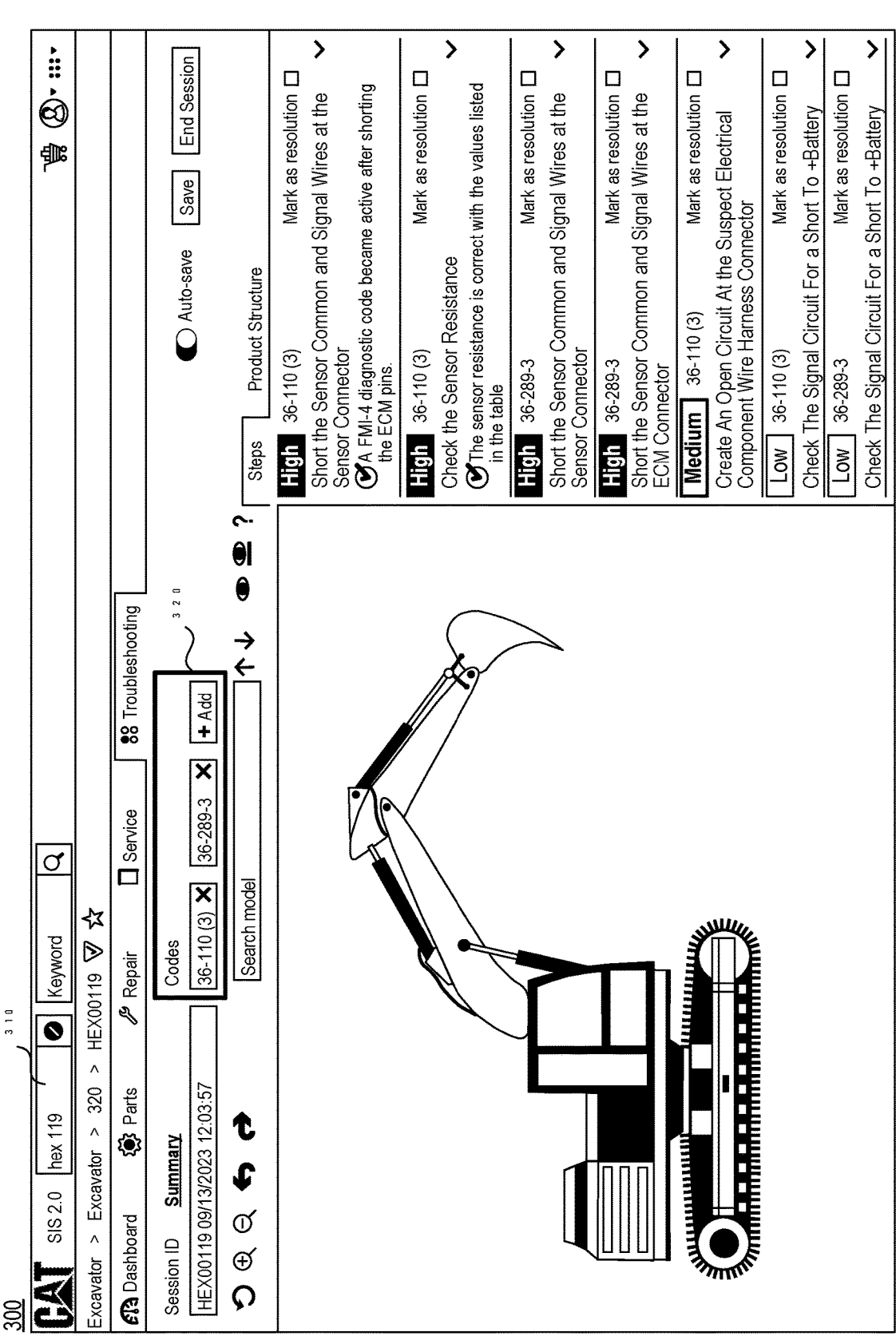
FIG. 3 shows a user interface to indicate a machine experiencing an issue and one or more issues with the machine.

FIG. 3 shows a user interface 300 to indicate a machine experiencing an issue and one or more issues with the machine. The user interface element 310 enables the user to select a type of machine, such as HEX00119. The user interface element 320 enables the user to select one or more symptoms, or issues, associated with the machine. Once the symptoms are selected, the system 100 in FIG. 2 guides the user to the multiple procedures described below.

Figure 4A:
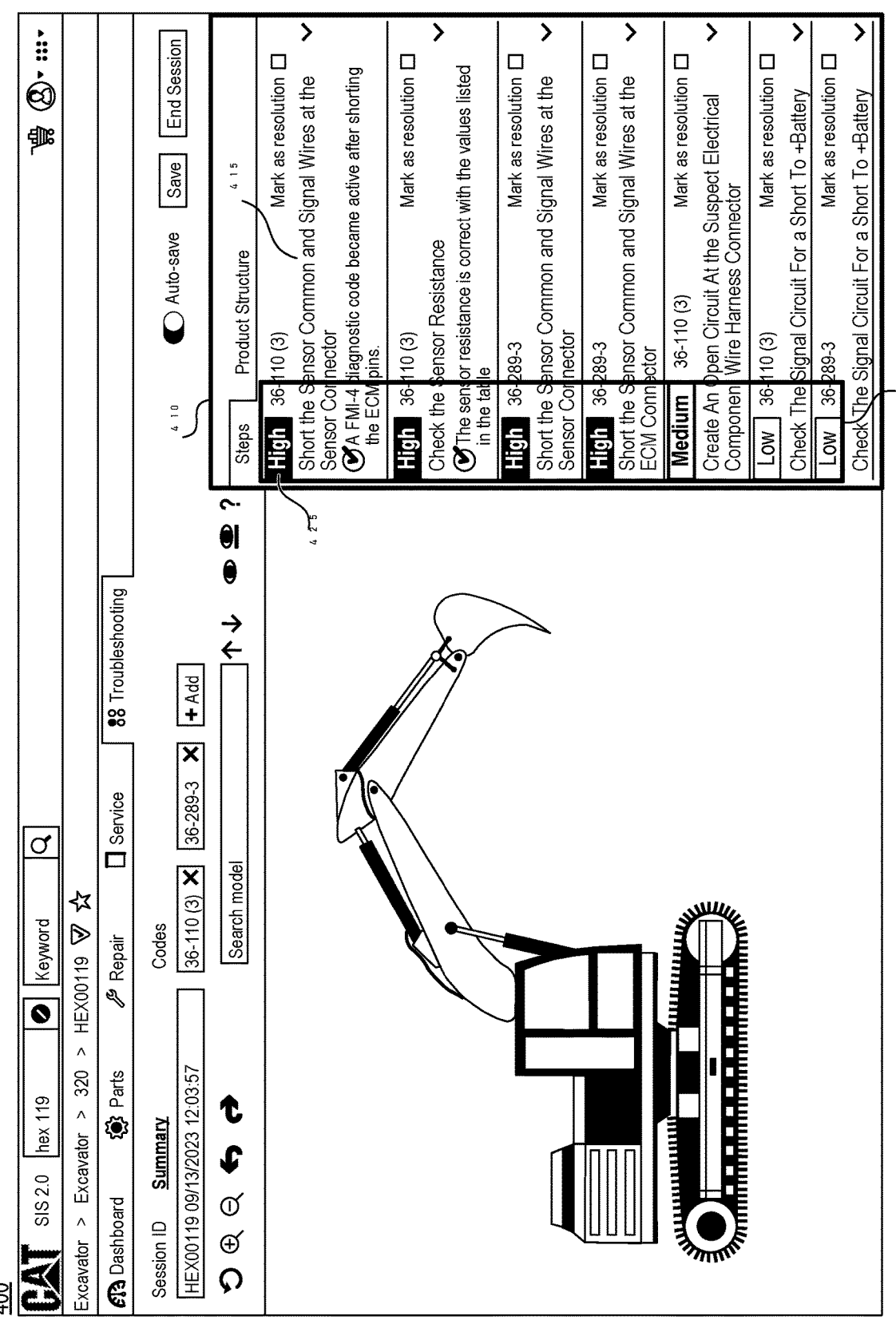
FIGS. 4A-4B show a user interface providing multiple procedures to the user.
Figure 4B:
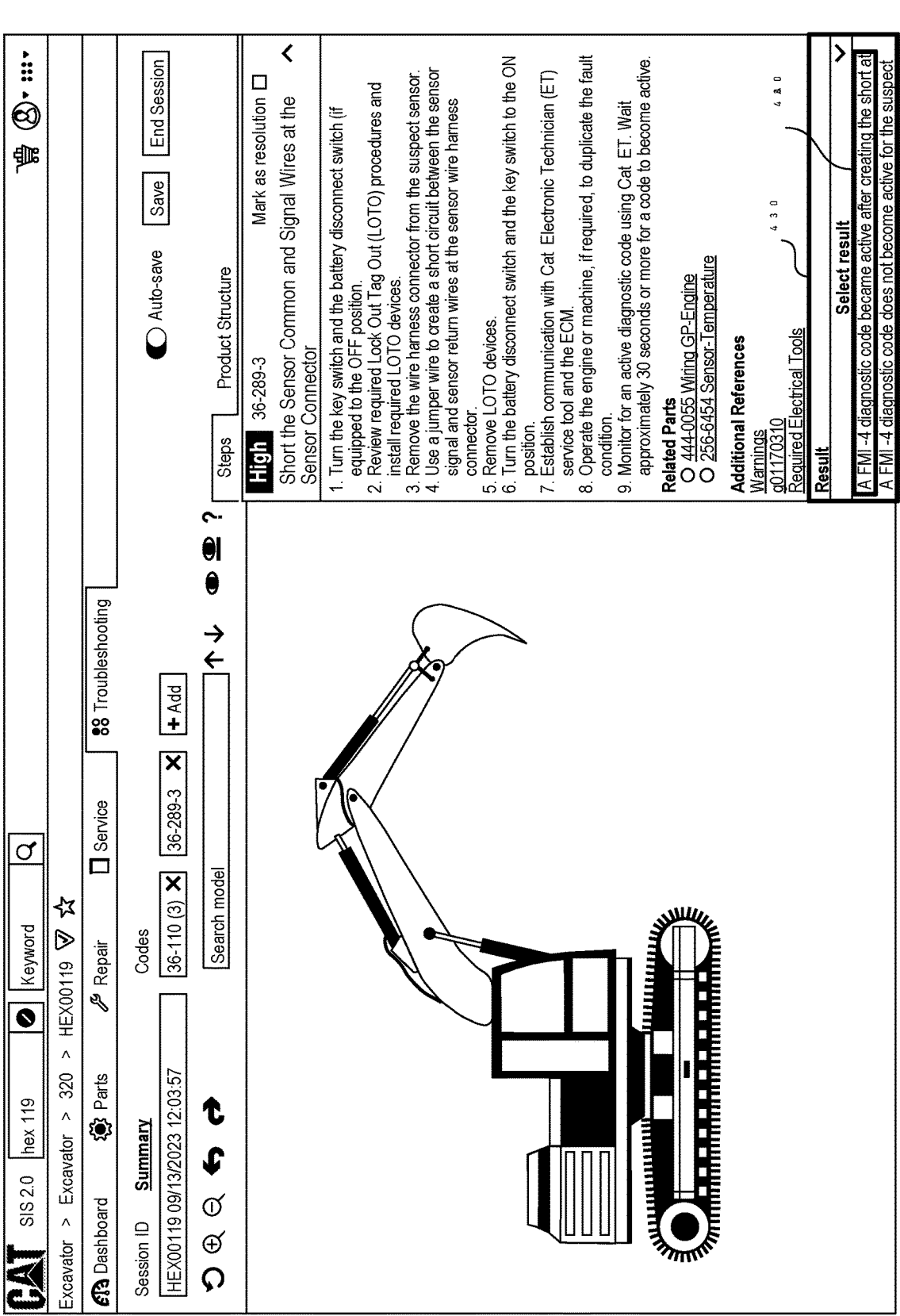

FIGS. 4A-4B show a user interface 400 providing multiple procedures to the user. Once the system 100 in FIG. 2 receives the input indicating the type of machine and the one or more issues the machine is experiencing, the system provides the user interface 400, which shows multiple different troubleshooting procedures 410, using the drop-down menu, that the user can perform to repair the machine. In addition, the system 100 provides multiple scores, e.g., relevance, 420, where one score, e.g., one relevance, 425, corresponds to one troubleshooting procedure 415. The ordering of the multiple scores 420 indicates which troubleshooting procedure among the multiple troubleshooting procedures 410 is likely the most relevant to the reported issue.

Once the user completes a troubleshooting procedure 425, the user can enter a result 430A of the troubleshooting procedure. The results 430 can be listed in a drop-down menu. Based on the results 430, the system 100 can recalculate the multiple scores 420 associated with the multiple troubleshooting procedures 410. The multiple scores 420 indicate which troubleshooting procedure to attempt next.

Figure 5:
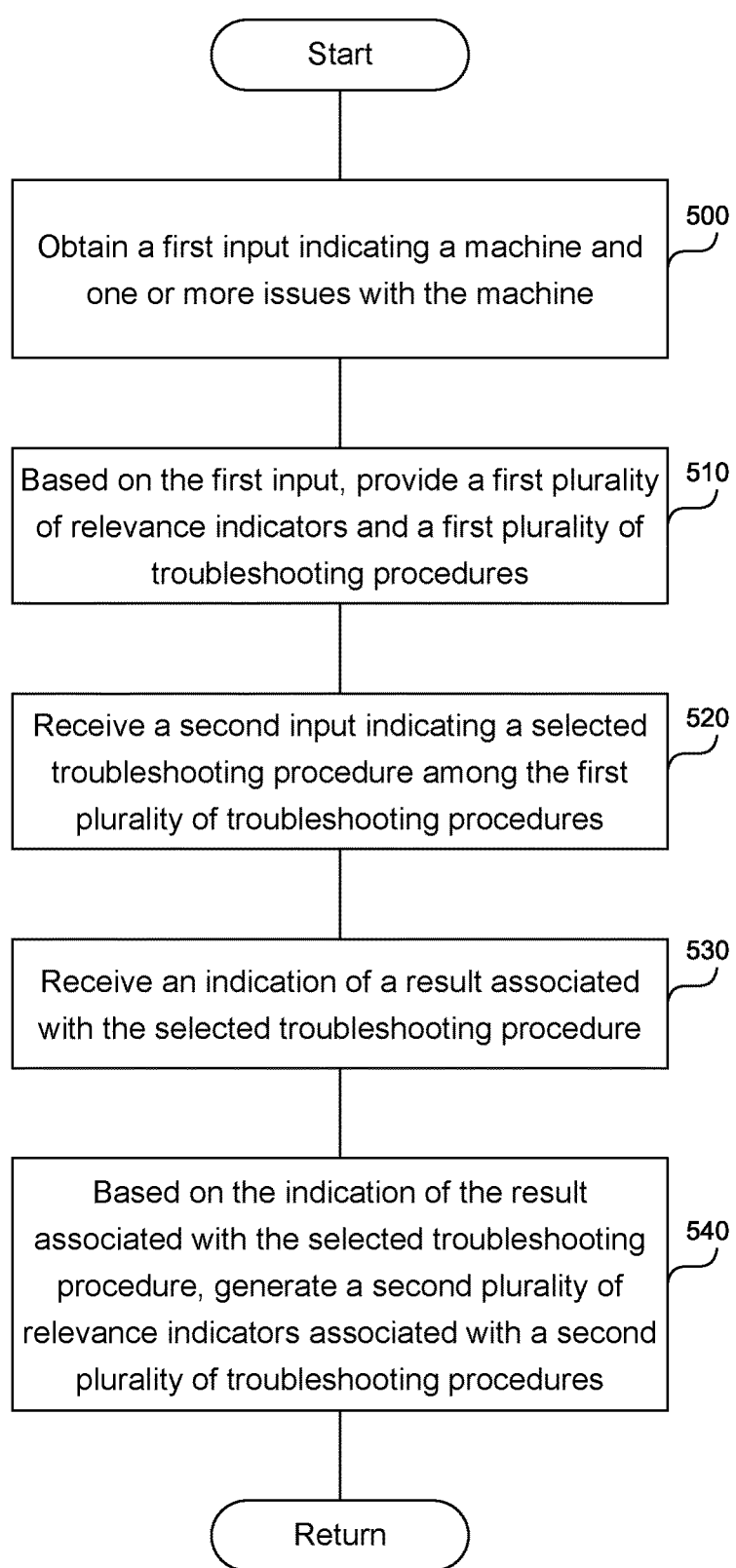
FIG. 5 is a flowchart of a method to streamline and customize a user's troubleshooting workflow.

FIG. 5 is a flowchart of a method to streamline and customize a user's troubleshooting workflow. A hardware or software processor executing instructions described in this application can, in step 500, obtain a first input indicating a machine experiencing an issue and one or more issues with the machine. The indication of the one or more issues with the machine can include a sensor-based symptom such as a diagnostic trouble code and/or non-sensor-based symptom of the machine, such as a description of the issue based on an inspection of the machine, based on sound produced by the machine, or based on a visual representation of the machine including a picture or a video.

In step 510, based on the first input, the processor can generate and provide a first multiplicity of relevance indicators and a first multiplicity of troubleshooting procedures, where a troubleshooting procedure among the first multiplicity of troubleshooting procedures indicates a test to perform or a repair step. A relevance indicator among the first multiplicity of relevance indicators is associated with the troubleshooting procedure among the first multiplicity of troubleshooting procedures in a one-to-one mapping. The first multiplicity of relevance indicators can include differing relevance indicators and can indicate a first troubleshooting procedure to perform next, i.e., the first troubleshooting procedure that is the most relevant to the issue experienced by the machine.

The processor can perform the following steps iteratively until either the issue is resolved or a second multiplicity of troubleshooting procedures is empty, whichever comes first. In step 520, the processor can receive a second input including a performed troubleshooting procedure among the first multiplicity of troubleshooting procedures. In step 530, the processor can receive an indication of a result associated with the performed troubleshooting procedure.

In step 540, based on the indication of the result associated with the performed troubleshooting procedure, the processor can generate a second multiplicity of relevance indicators associated with a second multiplicity of troubleshooting procedures, where the second multiplicity of relevance indicators indicates a second troubleshooting procedure to perform next. The second multiplicity of troubleshooting procedures can overlap with the first multiplicity of troubleshooting procedures or can have no overlap.

To obtain the first input, the processor can receive a natural language input describing the machine experiencing the issue and/or one or more issues with the machine. The processor can obtain multiple predetermined diagnostic codes associated with multiple issues. The processor can map the natural language input to a predetermined diagnostic code among the multiple predetermined diagnostic codes. Alternatively, the processor can receive an input from the user indicating the diagnostic code from the drop-down menu.

To generate the first multiplicity of relevance indicators and the first multiplicity of troubleshooting procedures, the processor can provide to an artificial intelligence the first input indicating the machine experiencing the issue and the one or more issues with the machine. The processor can obtain from a database multiple machines and multiple troubleshooting procedures associated with the multiple machines. The processor can determine whether the machine experiencing the issue is included among the multiple machines. Upon determining that the machine experiencing the issue is not included among the multiple machines, the processor can, via an artificial intelligence, determine a troubleshooting procedure among the multiple troubleshooting procedures that is most likely to resolve the one or more issues with the machine even though the troubleshooting procedure is not associated with the machine experiencing the issue. Upon determining that the machine experiencing the issue is included among the multiple machines, the processor can, via artificial intelligence, determine a troubleshooting procedure among the multiple troubleshooting procedures that is most likely to resolve the one or more issues with the machine, where the troubleshooting procedure is associated with the machine experiencing the issue.

To generate the first multiplicity of relevance indicators and the first multiplicity of troubleshooting procedures, the processor can obtain multiple inputs associated with multiple users resolving multiple issues associated with multiple machines. A particular input among the multiple inputs includes an indication of a particular machine experiencing a particular issue and an indication of one or more issues with the particular machine. Based on the multiple inputs, the processor can train an artificial intelligence to receive the first input and to provide a most likely repair associated with the one or more issues with the machine.

To generate the first multiplicity of relevance indicators and the first multiplicity of troubleshooting procedures, the processor can provide to an artificial intelligence the first input indicating the machine experiencing the issue and the one or more issues with the machine. The processor can obtain from the artificial intelligence the first multiplicity of relevance indicators and the first multiplicity of troubleshooting procedures.

The processor can obtain session duration, success rate associated with historical troubleshooting sessions of the user, other users segmented in the same group with the user, and how the user compares to the other users in the group. Based on the session duration and the success rate associated with the historical troubleshooting sessions, the processor can provide time, complexity, a number of parts, and material costs required to perform the troubleshooting procedure. In addition, the processor can provide the history of troubleshooting for the user, as well as the statistics of what similar users, those in the same group as the user, have done in the past.

To provide the first multiplicity of relevance indicators and the first multiplicity of troubleshooting procedures, the processor can order the first multiplicity of relevance indicators in a descending sequence. The processor can obtain multiple predetermined categories associated with the first multiplicity of relevance indicators, where the multiple predetermined categories indicate ranges associated with the first multiplicity of relevance indicators. The multiple predetermined categories can be color coded based on their importance to solving a problem or any other relevant troubleshooting measure, such as time. The processor can color the first multiplicity of relevance indicators based on the multiple predetermined categories. Finally, the processor can present to the user the colored first multiplicity of relevance indicators in the descending sequence.

Recommending a Troubleshooting Procedure to Perform

FIG. 6 shows the details of the interaction between the analytics engine 220 in FIG. 2 and the application 210 in FIG. 2. The analytics engine 220 includes databases 600, 610. The database 600 can store multiple troubleshooting procedures in a form of a graph 620. The nodes in the graph 620 represent a troubleshooting procedure, while the edges connect sequential troubleshooting procedures. Database 610 can store previous user activities, which can be used in segmentation as described in this application.

The application 210 enables the user 660 to specify troubleshooting procedures 640 performed before accessing the troubleshooting service. The application 210 can recommend troubleshooting procedures based on steps already performed outside of the application and within the application as the user troubleshoots. In addition, even if the user did not perform any troubleshooting procedures, the user can see procedures recommended based on default probabilities within the application 210. The user response module 630, part of the analytics engine 220, specifies what troubleshooting procedures 650 have the highest chance of solving the issues. The user response module 630 can rely on analytics engine parameters 670 to determine the troubleshooting procedures 650.

FIG. 7 shows the details of the operation of the user response module 630. In step 700, a processor implementing the user response module 630 can gather the appropriate graphs that are applicable to the troubleshooting procedures used in diagnosing and resolving the issue the machine is facing.

In step 710, the processor can calculate default scores with no user data and augment the default scores with data obtained from previous user troubleshooting experiences and subject matter experts. For example, subject matter experts can provide a design of the original graphs. The historical data including previous user troubleshooting experiences can provide scores for the graphs and nodes in the graphs, where the scores are based on historical success rates.

To determine the final scores, the processor can determine the initial troubleshooting procedure in the graph and determine the distance of each other troubleshooting procedure in the graph based on the number of edges between the initial troubleshooting procedure and each other troubleshooting procedure. The processor can determine the score of the troubleshooting procedure as (1) 100/the path with the least number of edges between the initial troubleshooting procedure and each other troubleshooting procedure.

The troubleshooting procedures can be color coded, as explained below.

In step 720, upon receiving an indication of a result associated with the troubleshooting procedure, the processor can remove completed troubleshooting procedures from the graph and boost scores of procedures associated with the completed troubleshooting procedures. Scores are boosted for procedures that are directly connected to results from a completed procedure. The boost amount (shown as 2× in FIG. 8B), can be set at any desired level. The boost amount of each procedure not completed is calculated by taking the total number of edges that are connected to a completed procedure divided by the total number of edges to the procedure. The ratio is then multiplied by the boost amount.

In step 730, the processor can order the activity adjusted score or percentile ranking for each troubleshooting issue from greatest to least.

In step 740, the processor can apply percentiles to all codes and bucket the percentiles into meaningful buckets. The processor can color code the bucket, using a traffic light including "red," "yellow," and "green," or other numerical representation to signify which procedures are recommended to be performed next.

In step 750, the processor can format the multiple troubleshooting procedures and multiple scores into an API acceptable format and send the result to the mobile device.

FIGS. 8A-8D show steps of guiding the user toward issue resolution. The graph 800 includes multiple troubleshooting procedures 1, 2, 3, 4, 5, 6 directed to resolving a particular issue such as "crankcase air pressure sensor voltage is above normal." The troubleshooting procedures 1 and 2 represent error codes that the user has entered into the system 100. Based on the error codes represented by procedures 1, 2, the system 100 has selected the graph 800 as the most likely graph that can lead to the resolution of the issue with the machine. The system 100 may not present the graph 800 to the user and can instead present the nodes 1, 2, 3, 4, 5, 6 as line items shown in FIG. 4. The system 100 indicates the troubleshooting procedure 1 as the initial procedure in the graph 800.

The scores 870 are calculated based on the equation (1). For example, the troubleshooting procedure 4 has a score of 100 because the distance between the initial troubleshooting procedure 1 and the troubleshooting procedure 4 is 1. Similarly, the distance between the troubleshooting procedure 1 and 3 is 4, and thus, the troubleshooting procedure 3 has a default score of 25.

The troubleshooting procedures that have been completed, 1 and 2, can be color coded gray. The remainder of the troubleshooting procedures 3, 4, 5, 6 can be color coded based on their scores and color-coding categories. Specifically, a score between 80 and 100 can be assigned the green ranking, a score between 40 and 80 can be assigned a yellow ranking, while the score between 0 and 40 can be assigned an orange ranking. Consequently, node 4 is color coded green because it has a default score of 100, node 3, 5 is color coded orange because they have scores of 25 and 33, respectively, while node 6 is color coded yellow because it has a score of 50.

Figure 8A:
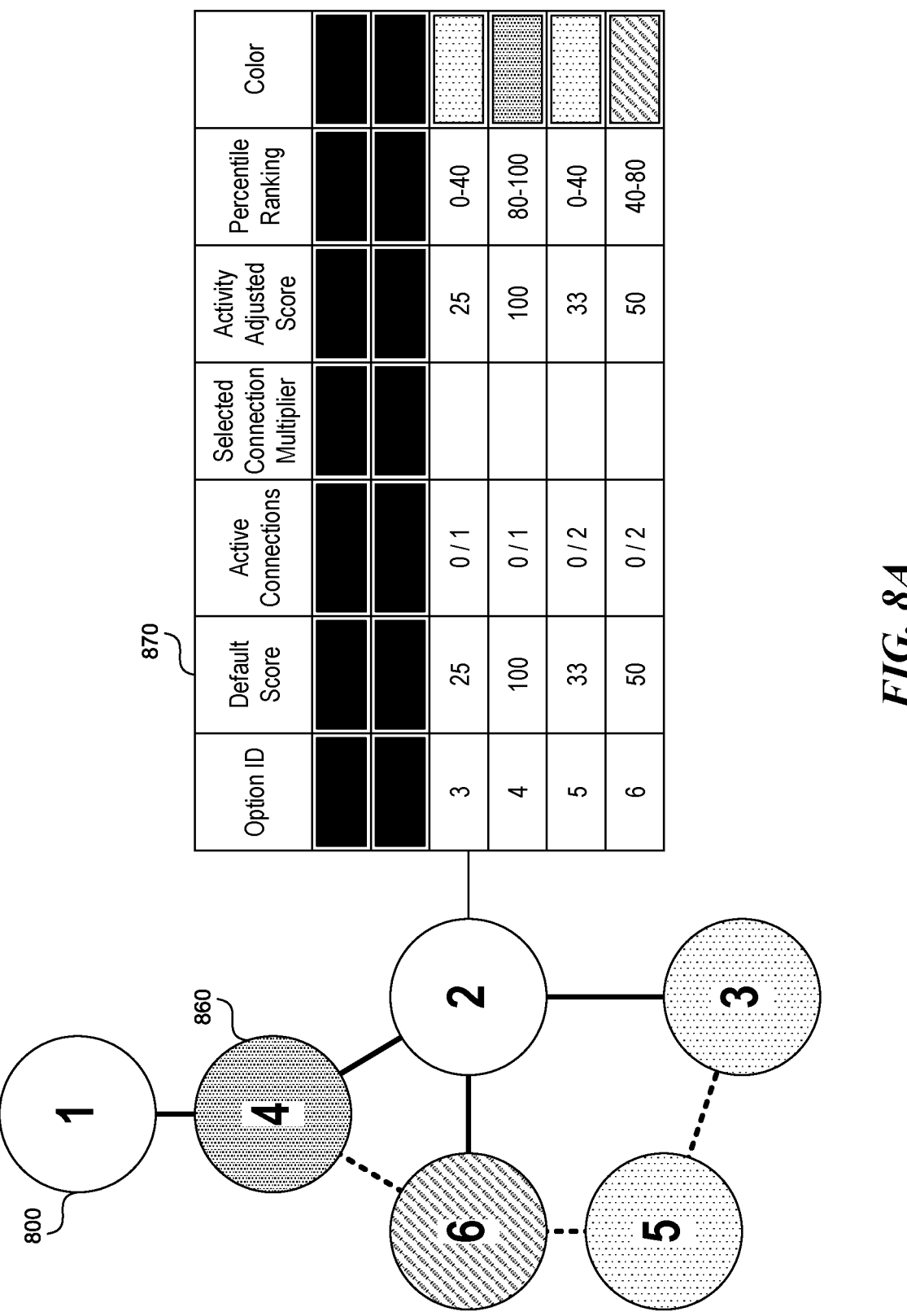
FIGS. 8A-8D show steps of guiding the user toward issue resolution.
Figure 8B:
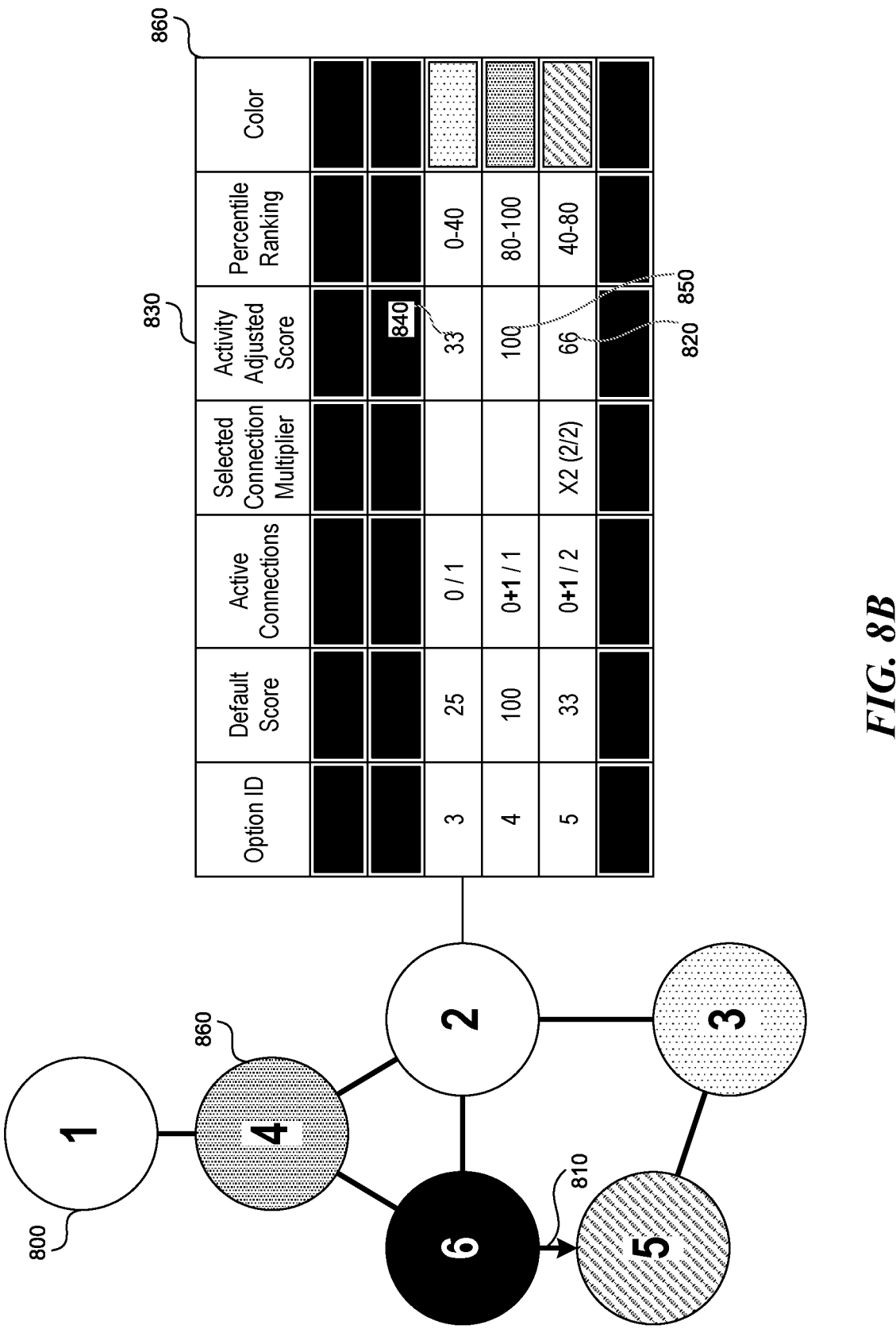

FIG. 8B shows the state of the graph 800 when the user elects to perform troubleshooting procedure 6 against the recommendation 860 of the system. After performing procedure 6, the user can enter the results of the performed procedure. Each node 3, 4, 5, 6 can have an input condition indicating a state, e.g., a result, that needs to occur prior to the node becoming relevant. For example, node 5 can include a condition that indicates that the voltage needs to be below 5 V. When the result entered after performing procedure 6 satisfies the condition associated with node 5, the system 100 boosts the score of the activated procedure, e.g., procedure 5. Specifically, procedures that are directly connected to the results from the completed procedure are multiplied by the number of received results that point specifically to that procedure.

As can be seen in FIG. 8B, troubleshooting procedure 5 has been "activated" because the result of procedure 6 matches the condition associated with troubleshooting procedure 5. Consequently, the number of active connections going to troubleshooting procedure 5 is 1, namely, connection 810. Consequently, the boosted score 820 of node 5 is doubled to 66. As seen in column 830, other scores 840, 850 of nodes 3 and 4, respectively, are recomputed, according to formula (1), to indicate the distance from the recommended node 4. In addition, node 6 is color coded to black to indicate that it has been performed. In addition, the node 6 is removed from the recommendation 860.

Figure 8C:
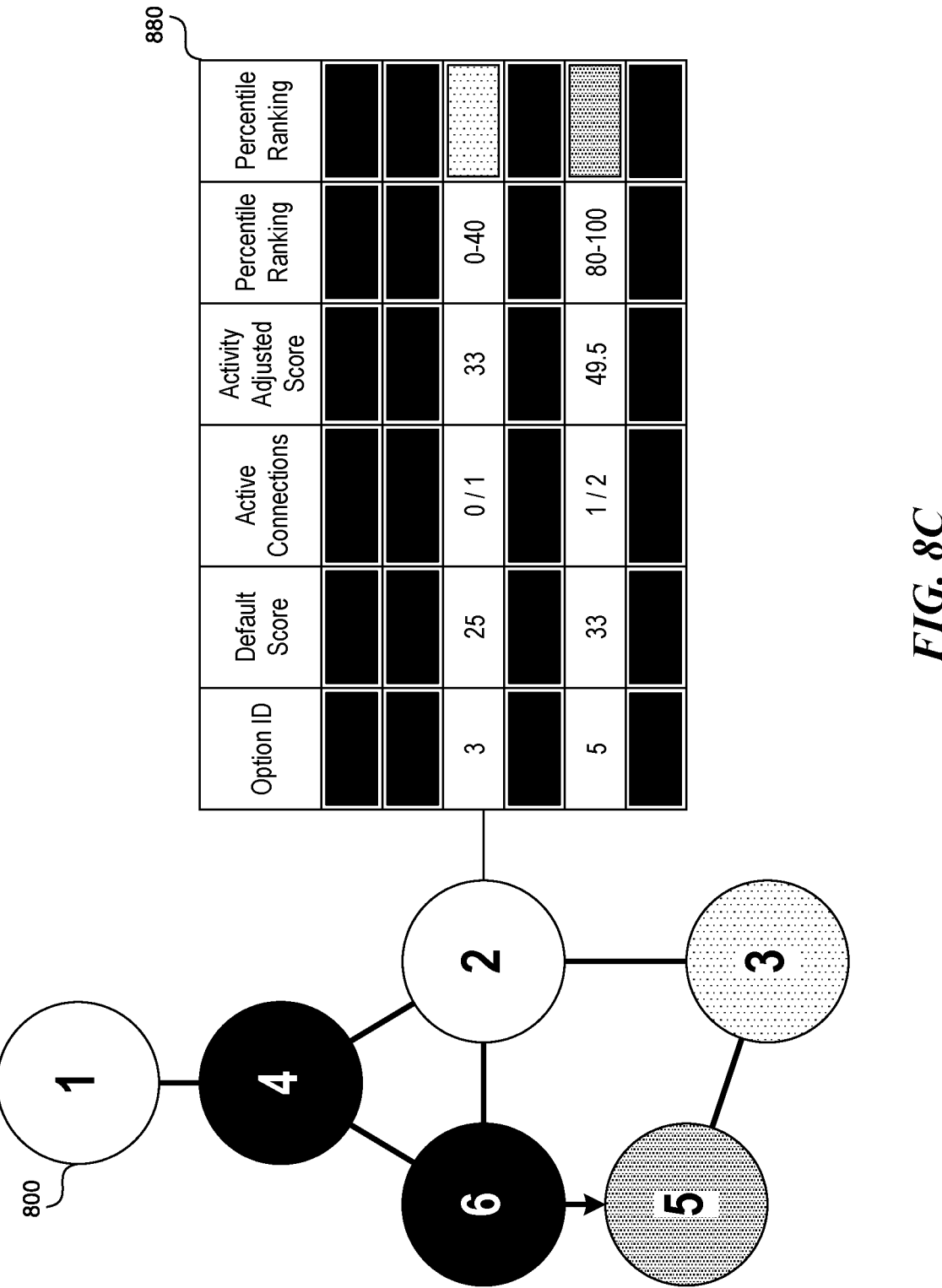

FIG. 8C shows the state of the graph 800 when the user elects to perform troubleshooting procedure 4 after performing troubleshooting procedure 6. Both nodes 4 and 6 are color coded in the graph 800 to indicate that these troubleshooting procedures have been performed, and both nodes are removed from the recommendation 880. In addition, the scores of the remaining nodes 3 and 5 are updated. Score 3 does not change because the distance to the recommended node 4 remains the same, while the score of node 5 is reduced.

Figure 8D:
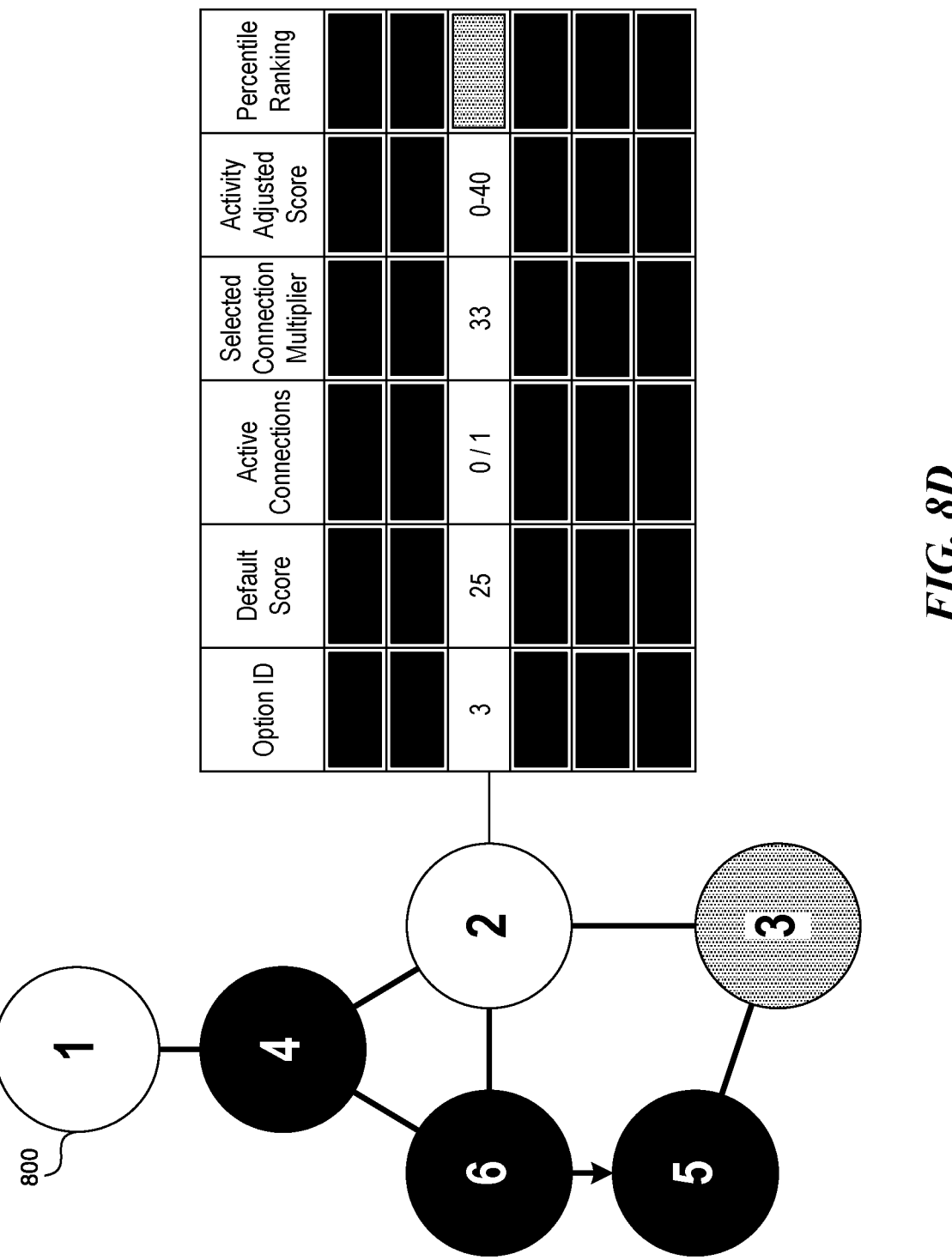

FIG. 8D shows the state of the graph when the user selects to perform option 5 using the recommendations. With only one option left, namely, troubleshooting procedure 3, the troubleshooting procedure 3 is color coded green, and the score of node 3 increases to 50 because it is only one edge away from the recommended node 5.

The disclosed system 100 can handle multiple different issues with multiple different machines or multiple different issues with the same machine at the same time.

Figure 9:
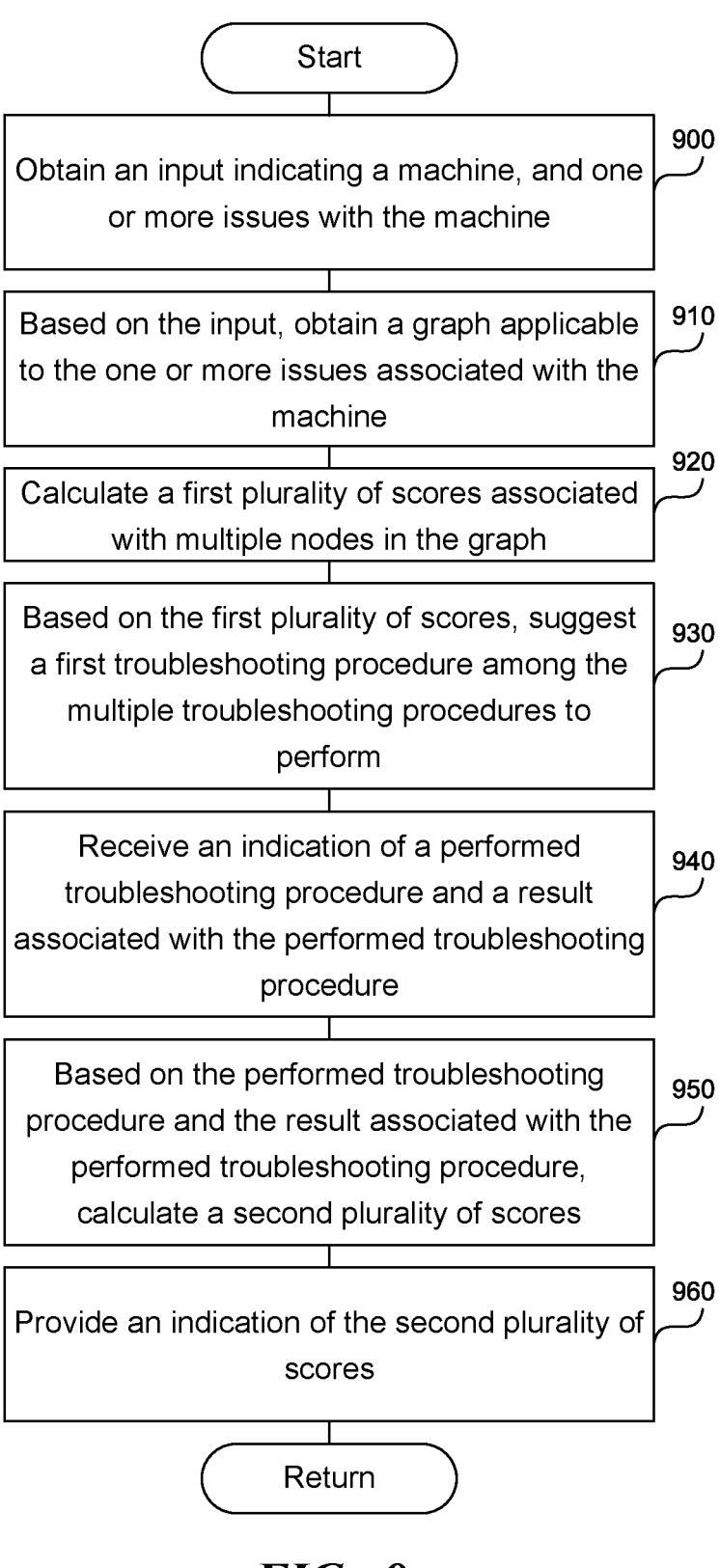
FIG. 9 is a flowchart of a method to recommend the best troubleshooting procedure to perform.

FIG. 9 is a flowchart of a method to recommend the best troubleshooting procedure to perform. A hardware or software processor executing instructions described in this application can, in step 900, obtain a first input indicating a machine experiencing an issue and one or more issues with the machine. The indication of the one or more issues with the machine can include a sensor-based symptom such as a diagnostic trouble code and/or non-sensor-based symptom of the machine, such as a description of the issue based on an inspection of the machine, based on sound produced by the machine, or based on a visual representation of the machine including a picture or a video.

Based on the input, in step 910, the processor can obtain one or more graphs applicable to the one or more issues associated with the machine by matching error codes obtained from the first input to a node in the one or more graphs. In other words, the one or more graphs include a node indicating an error code associated with the one or more issues associated with the machine. The one or more graphs can represent multiple troubleshooting procedures. A node in the graph represents a troubleshooting procedure among the multiple troubleshooting procedures, and an edge represents a sequential relationship between two troubleshooting procedures among the multiple troubleshooting procedures. A troubleshooting procedure among the multiple troubleshooting procedures indicates a test to perform or a repair step.

The processor can obtain multiple historical success rates associated with the one or more graphs. Success rates can be calculated by segmenting users into groups and calculating scores for each graph and node in the graph based on how successful the graph and the node were in resolving the issue for the users in the same group as the user providing the input.

In step 920, the processor can calculate a first multiplicity of scores associated with multiple nodes in the graph.

In step 930, based on the first multiplicity of scores, the processor can suggest a first troubleshooting procedure among the multiple troubleshooting procedures to perform. The first troubleshooting procedure can be represented by the node in the graph.

In step 940, the processor can receive an indication of a performed troubleshooting procedure and a result associated with the performed troubleshooting procedure.

In step 950, based on the performed troubleshooting procedure and the result associated with the performed troubleshooting procedure, the processor can calculate a second multiplicity of scores associated with the graph.

In step 960, the processor can provide an indication of the second multiplicity of scores, where the indication of the second multiplicity of scores suggests a second troubleshooting procedure to perform.

The processor can receive an indication of multiple results associated with the performed troubleshooting procedure, where the multiple results include the result associated with the performed troubleshooting procedure. Upon receiving the indication of the result associated with the performed troubleshooting procedure, the processor can remove the performed troubleshooting procedure from the first multiplicity of troubleshooting procedures to obtain the second multiplicity of troubleshooting procedures. The processor can adjust the second multiplicity of scores associated with the second multiplicity of troubleshooting procedures by performing the following steps. First, the processor can determine a subset of troubleshooting procedures among the second multiplicity of troubleshooting procedures, where the subset of troubleshooting procedures is coupled to the result from the performed troubleshooting procedure. Second, the processor can determine a number of results among the multiple results that point to each troubleshooting procedure among the subset of troubleshooting procedures. Finally, the processor can increase the score of each troubleshooting procedure among the subset of troubleshooting procedures based on the number of results that point to each troubleshooting procedure.

The processor can obtain multiple demographic information associated with multiple users performing multiple troubleshooting procedures associated with the multiple graphs. The demographic information can include age, gender, education, and location. The location can indicate available equipment to test the machine having the issue. For example, users in Asia can have different equipment from users in Europe and different equipment from users in Africa. The processor can obtain demographic information associated with a user providing the input and segment the multiple users and the user into multiple groups based on the demographic information to obtain a relevant group including the user. Within the relevant group, the processor can determine the historical success rates associated with the multiple graphs. Among the multiple graphs, the processor can select a graph having the highest success rate within the relevant group. The processor can suggest the first troubleshooting procedure to perform, where the first troubleshooting procedure belongs to the graph having the highest success rate within the relevant group.

The processor can obtain the multiple graphs, where each graph among the multiple graphs includes a node indicating an error code associated with the one or more issues associated with the machine. The processor can calculate a score associated with the node in the graph to be negatively correlated to a distance between the node in the graph and the node indicating the error code to obtain the first multiplicity of scores. The processor can order the multiple nodes in the graph based on the first multiplicity of scores, including the score to obtain a node ordering. The processor can suggest the first troubleshooting procedure based on the node ordering.

The processor can calculate a score associated with the node in the graph to be negatively correlated to a distance between the node in the graph and the first troubleshooting procedure to obtain the second multiplicity of scores. The processor can order the multiple nodes in the graph based on the second multiplicity of scores, including the score to obtain a node ordering. The processor can suggest the second troubleshooting procedure based on the node ordering.

Upon receiving the indication of the result associated with the performed troubleshooting procedure, the processor can adjust the second multiplicity of scores associated with the second multiplicity of troubleshooting procedures by performing the following steps. First, the processor can determine a subset of troubleshooting procedures among the second multiplicity of troubleshooting procedures, where the subset of troubleshooting procedures is coupled to the result from the performed troubleshooting procedure. Second, the processor can determine each troubleshooting procedure among the subset of troubleshooting procedures that point to the result. Finally, the processor can increase a score associated with each troubleshooting procedure among the subset of troubleshooting procedures.

Recommending a Repair Step to Perform

Figure 10:
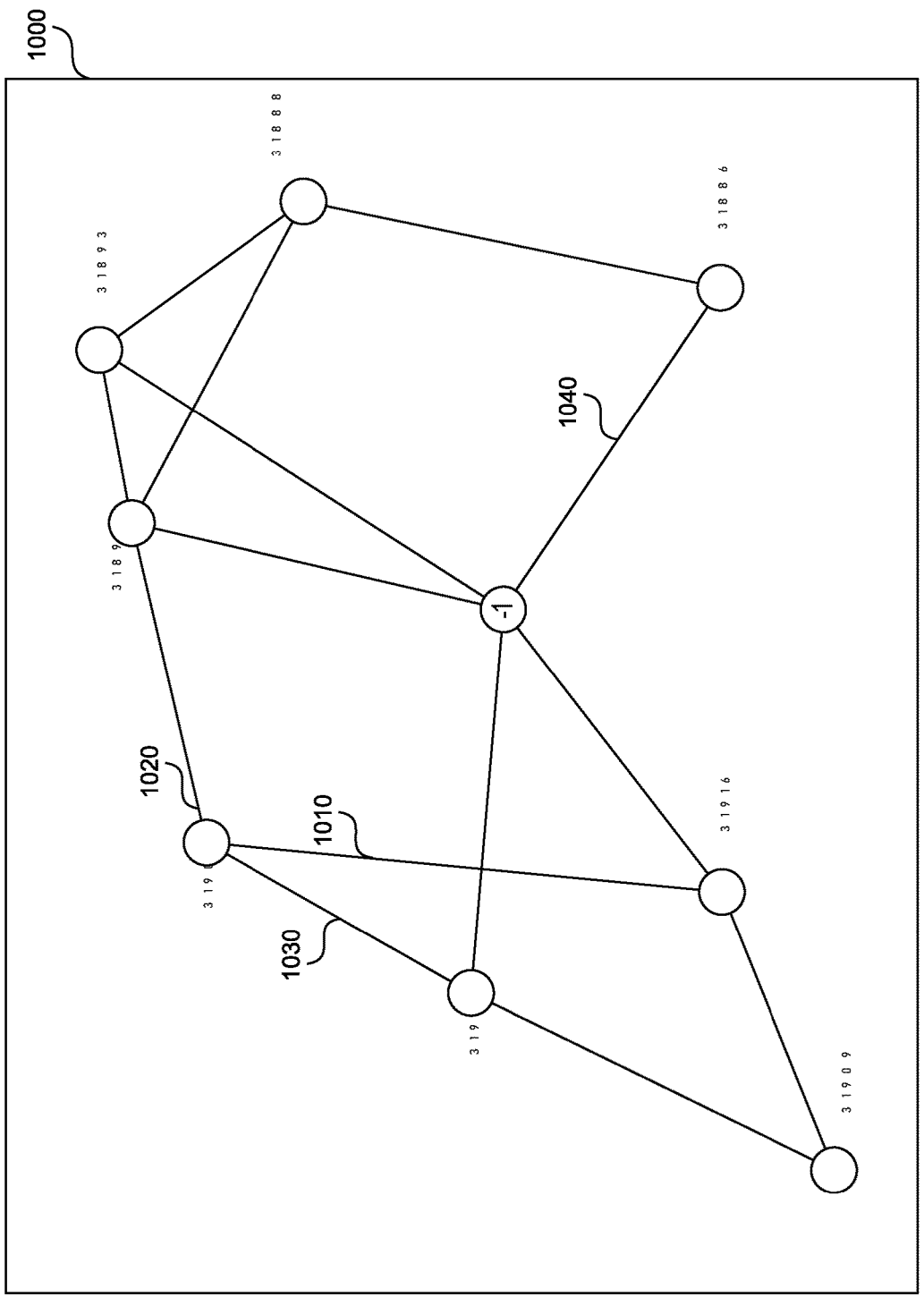
FIG. 10 shows a graph representing a troubleshooting guide associated with a device experiencing an issue.

FIG. 10 shows a graph 1000 representing a troubleshooting guide associated with a device experiencing an issue. The device can be a machine, such as a vehicle, e.g., a heavy-duty vehicle, a physical repairable object, a computer, a chip, or any electronic device. The computer can include a server, a cloud computer, or a personal computer, including a mobile device, a tablet, or a built-in device.

Node −1 is an end node and indicates that the issue with the device has been resolved. Each node 31905, 31886, except for node −1, represents a procedure to perform, such as a testing procedure. Each testing procedure can produce a result represented by edges 1010, 1020, 1030, 1040 (only four labeled for brevity). The result can be an error code, an observed behavior, or a repair step to perform to resolve an issue associated with the device. For example, the node 31905 can indicate a test to perform, and the test can produce different results represented by edges 1010, 1020, 1030.

Figure 11:
FIG. 11 shows a graph representing a troubleshooting guide including repair nodes.

FIG. 11 shows a graph 1100 representing a troubleshooting guide including repair nodes. The disclosed system generates graph 1100 from graph 1000 in FIG. 10 by converting each edge 1040 in FIG. 10 containing a repair step into a repair node 31919, 31925, 31923, 31927, 31960, 31949. The system can generate the graph 1100 and all the repair nodes 31919, 31925, 31923, 31927, 31960, 31949 simultaneously, in a single step. As can be seen in graph 1100, every edge in graph 1000 does not contain a repair step. Edges 1110, 1120 (only two labeled for brevity) in graph 1100 represent a sequential relationship between two nodes.

Repair nodes 31919, 31925, 31923, 31927, 31960, 31949 include instructions on repairs to perform on the device and as can be seen in graph 1100, most repair nodes 31919, 31925, 31927, 31960, 31949 lead directly to the end node −1. Only the repair node 31923 is two steps away from the end node −1. By contrast, no troubleshooting nodes are directly connected to the end node −1.

For example, troubleshooting node 31886 can include an indication of a testing step such as:

Inspect the Electrical Connectors and the Wiring

A. Remove electrical power from the engine control module (ECM).

B. Turn the keyswitch to the OFF position.

C. Thoroughly inspect connectors. Refer to Troubleshooting, "Electrical Connectors-Inspect" for details.

D. Perform a 45 N (10 lb) pull test on each of the wires in the ECM connector and each of the wires that are associated with injector solenoids.

E. Check the Allen head screw on each ECM connector for the proper torque. Refer to Troubleshooting, "Electrical Connectors-Inspect" for the correct torque values.

F. Check the harness and wiring for abrasions and for pinch points from the injectors to the ECM.

Repair node 31919, connected to the troubleshooting node 31886, indicates that there is a problem with the connectors and/or wiring. The repair node 31919 indicates a repair to perform, such as: "Repair the connectors or wiring and/or replace the connectors or wiring. Ensure that all the seals are properly in place and ensure that the connectors are coupled. Verify that the repair eliminates the problem."

Figure 12:
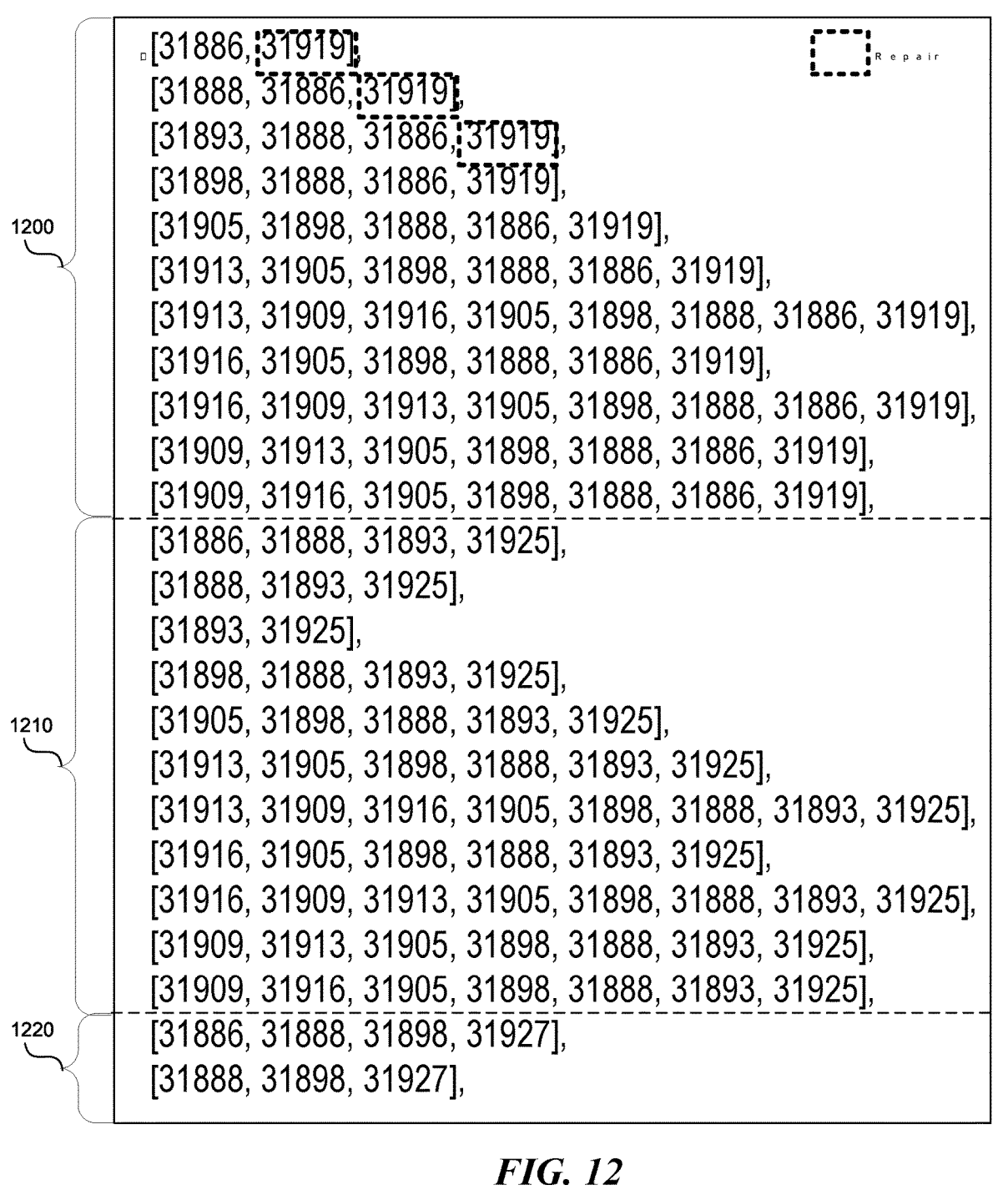

FIG. 12 shows multiple paths extracted from the graph 1100 in FIG. 11. The system can use multiple graphs, including the graph 1100 in FIG. 11, to generate training data and train an artificial intelligence to provide a most likely repair step to resolve the issue with the machine without requiring performance of the testing step. In effect, the artificial intelligence enables the user to skip performing testing operations and hones in on the repair step that can resolve the issue, thus saving the user a significant amount of time. Alternatively, if the user has performed testing operations, the system can enable the user to enter the results of performing those testing operations as inputs, and as a result, the system can provide a set of most likely repair steps.

To prepare the training data, the system extracts all paths 1200, 1210, 1220 that lead to a repair node 31919, 31925, 31923, 31927, 31960, 31949 while excluding another repair node or the end node −1. For example, paths 1200 are the paths in the graph 1100 in FIG. 11 that lead to the repair node 31919. Paths 1210 are the paths in graph 1100 that lead to the repair node 31925, while paths 1220 are some of the paths that lead to the repair node 31927.

Figure 13:
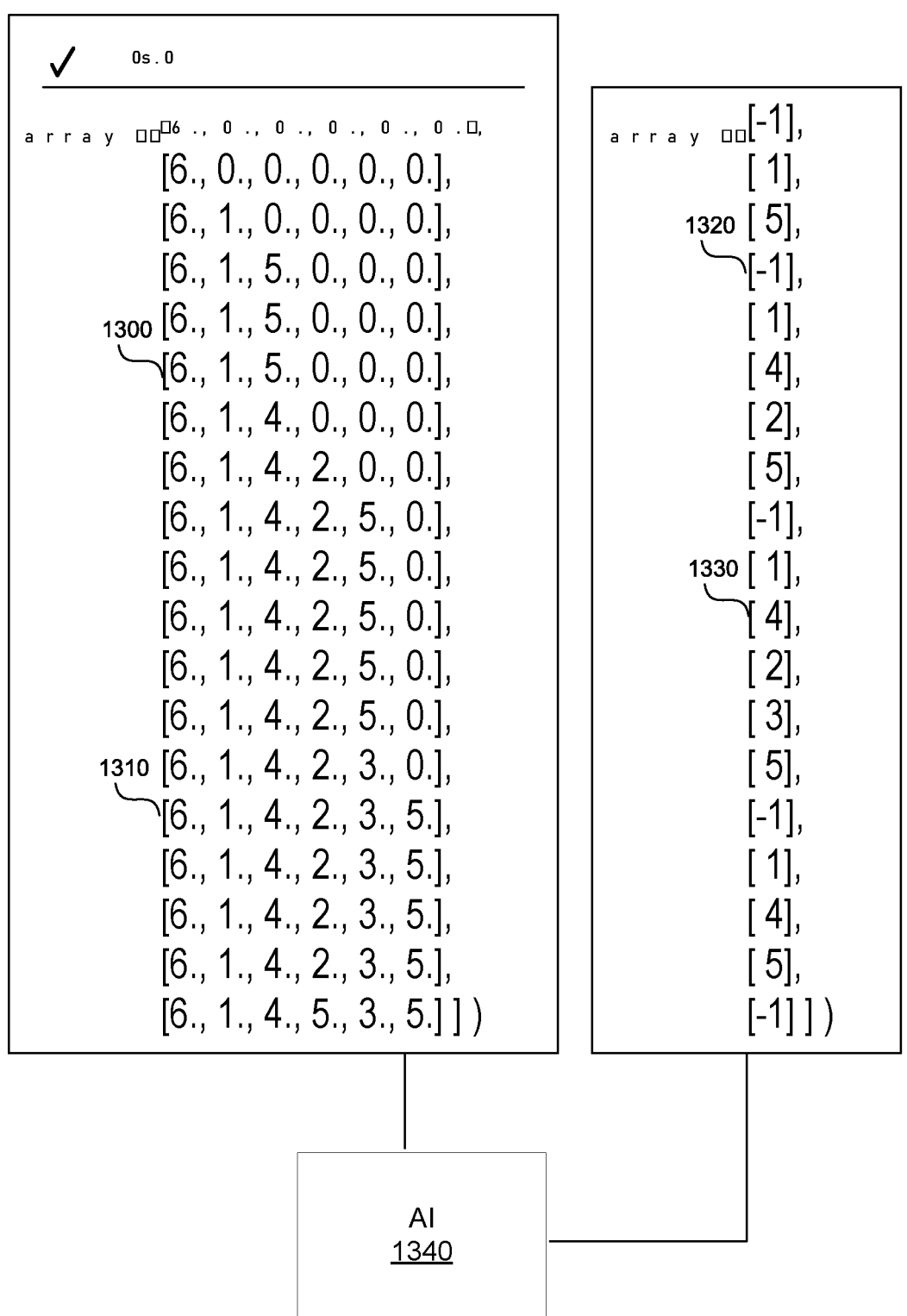
FIG. 13 shows an encoding of the multiple paths that can be provided to an artificial intelligence.

FIG. 13 shows an encoding of the multiple paths 1200, 1210, 1220 in FIG. 12 that can be provided to an artificial intelligence. Each path among the multiple paths 1200, 1210, 1220 is encoded, using one-to-one mapping, into a unique numerical identifier 1300, 1310, 1320, 1330 (only four labeled for brevity). The unique numerical identifiers 1300, 1310, 1320, 1330 can be provided as training data to the artificial intelligence 1340.

When trained, the artificial intelligence 1340 can receive an indication of an issue with a machine, such as an error code, or an indication of an aberrant behavior, and the artificial intelligence can provide the most likely repair step causing the issue without requiring performance of multiple testing steps, thus saving time in resolving the issue.

Figure 14:
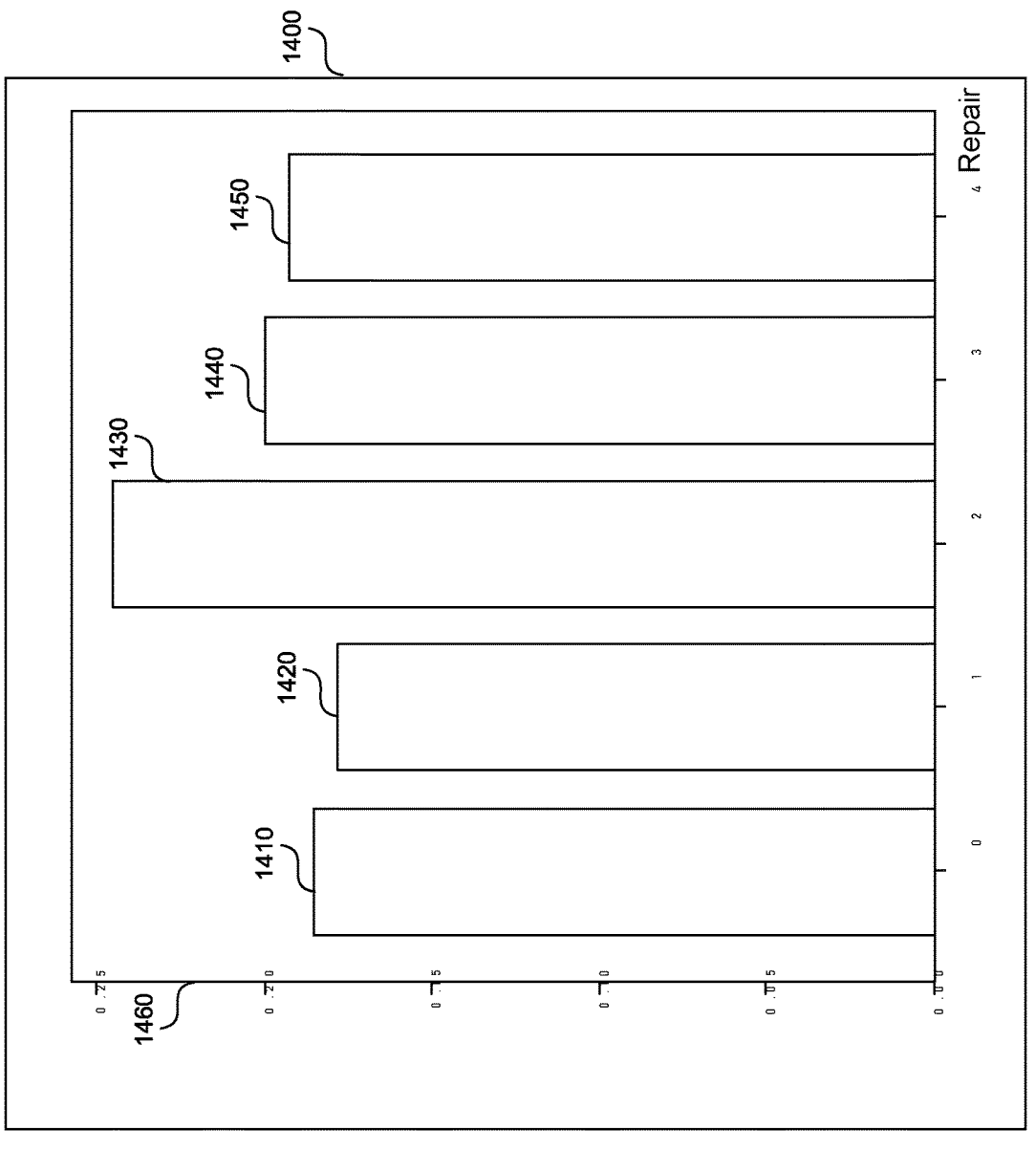
FIG. 14 shows an output of the artificial intelligence.

FIG. 14 shows an output of the artificial intelligence 1340 in FIG. 13. The output 1400 can indicate various repairs 1410, 1420, 1430, 1440, 1450 and a probability of success 1460 on the Y axis. Overall, the chart 1400 specifies which repair should be performed that would give the highest probability of success, given the sequence of procedures and results that have already been performed.

Figure 15:
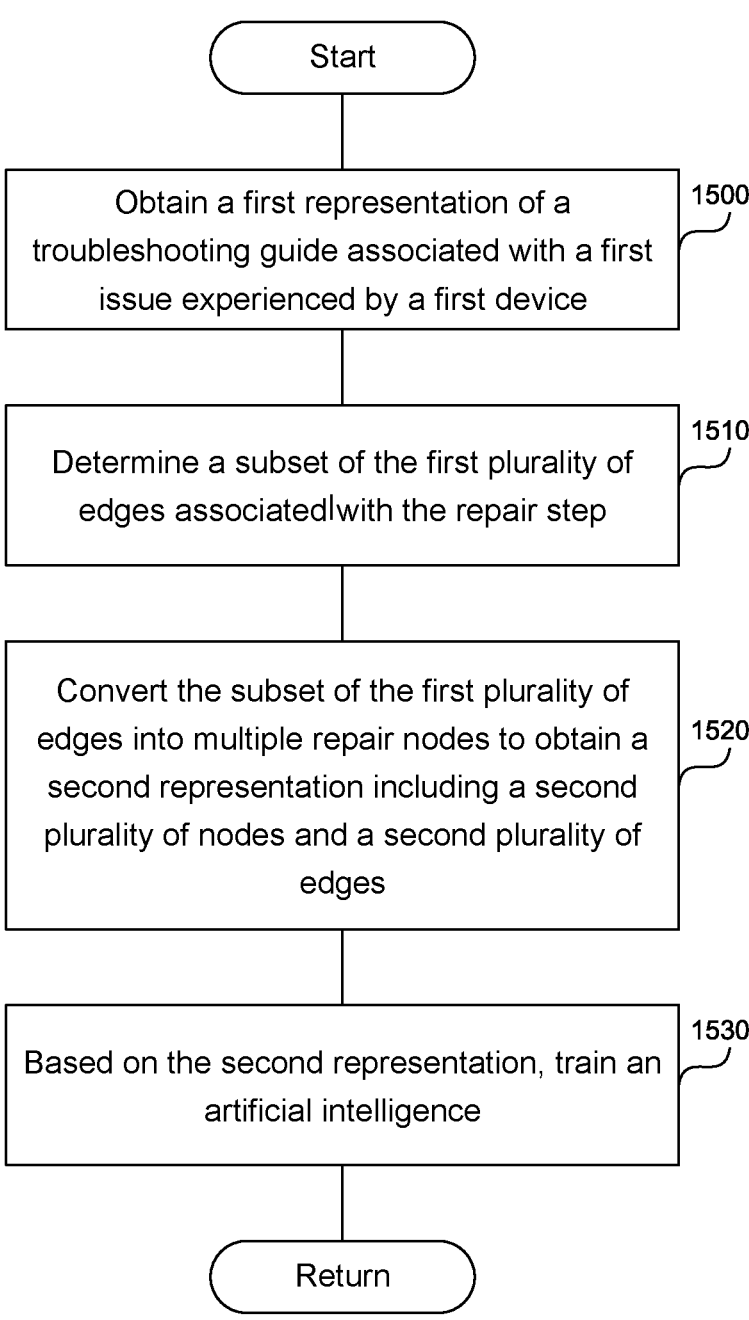
FIG. 15 is a flowchart of a method to recommend repair steps to perform.

FIG. 15 is a flowchart of a method to recommend repair steps to perform. A hardware or software processor executing instructions described in this application can, in step 1500, obtain a first representation of a troubleshooting guide associated with a first issue experienced by a first device. The representation can be a graph. The first representation can include a first multiplicity of nodes and a first multiplicity of edges, where a node among the first multiplicity of nodes can indicate a troubleshooting procedure and an edge among the first multiplicity of edges can indicate a result associated with the troubleshooting procedure. The result associated with the troubleshooting procedure can indicate a testing step or a repair step. The testing step indicates a test to perform resulting in an error code or inducing a behavior associated with the first device. The repair step indicates a repair to perform to resolve the first issue.

In step 1510, the processor can determine a subset of the first multiplicity of edges associated with the repair step, where each edge in the subset indicates a repair step and not a testing step.

In step 1520, the processor can convert the subset of the first multiplicity of edges into multiple repair nodes to obtain a second representation including a second multiplicity of nodes and a second multiplicity of edges. The mapping between the subset of the first multiplicity of edges and the repair nodes can be one-to-one. In other words, one edge among the subset of the multiple edges can correspond to one repair node among the multiple repair nodes. A repair node among the multiple repair nodes can indicate the repair step resolving the first issue experienced by the first device. A second multiplicity of nodes can include the first multiplicity of nodes and the multiple repair nodes. An edge among the second multiplicity of edges can represent a relationship between two nodes in the second multiplicity of nodes and may no longer indicate a result.

In step 1530, based on the second representation, the processor can train an artificial intelligence to receive an indication of a second issue experienced by a second device and to provide a most likely repair step to resolve the second issue without requiring performance of the testing step. By providing the most likely repair step, and not asking an operator to perform multiple tasks to resolve the issue, the artificial intelligence can save a lot of time in performing the repair.

The processor can convert the subset of the first multiplicity of edges into multiple repair nodes to obtain a second representation including a second multiplicity of nodes and a second multiplicity of edges. The second representation can include an end node, where reaching the end node indicates that the first issue has been resolved. The processor can extract, from the second representation, multiple paths through the second representation leading to a repair node, where the multiple paths do not include a second repair node or the end node. The processor can encode the multiple paths into multiple unique identifiers. Finally, the processor can train the artificial intelligence using the multiple unique identifiers.

The processor can obtain multiple paths through the second representation leading to a repair node, where a path among the multiple paths does not include a second repair node. The processor can encode the multiple paths into multiple unique identifiers to generate training data for the artificial intelligence.

The processor can receive an indication of a second issue associated with a second device. The processor can provide the indication of the second issue to the artificial intelligence. The processor can enable efficient repair of the second issue associated with the second device by obtaining from the artificial intelligence an indication of a most likely repair step to resolve the second issue without requiring performance of the testing step.

The processor can convert the subset of the first multiplicity of edges into multiple repair nodes to obtain a second representation including a second multiplicity of nodes and a second multiplicity of edges. The processor can generate training data for the artificial intelligence by extracting, from the second representation, multiple paths through the second representation leading to a repair node, where a path among the multiple paths does not include a second repair node or the end node.

The processor can generate, by the artificial intelligence, an indication of the repair step and a time associated with performing the repair step, where the time associated with performing the repair step is less than a time needed to perform the testing step and a second repair step.

Figure 16:
FIG. 16 shows a system to resolve an issue associated with a particular machine without using a troubleshooting guide directed to the particular machine.

Resolving an Issue Experienced by a Particular Device without Using a Troubleshooting Guide Directed at the Particular Device FIG. 16 shows a system 1600 to resolve an issue associated with a particular machine without using a troubleshooting guide directed to the particular machine. The system 1600 can include machine information 1610, artificial intelligence (AI) 1660, and training data 1670 for the particular machine 1690. The AI 1660 can be a generative AI, that is, a deep learning model that can generate troubleshooting procedures for machines that do not have a troubleshooting guide available.

For example, the AI 1660 can be a Long Short-Term Memory (LSTM) network used in the field of deep learning. LSTM is a version of recurrent neural networks (RNNs) that are capable of learning long-term dependencies, especially in sequence prediction problems. The AI 1660 can dynamically interact with users via a chatbot system, described in this application, to troubleshoot procedures when there are no troubleshooting guides for the particular machine 1690.

The AI 1660 can be trained using training data 1670, which can include encodings of paths 1200, 1210, 1220 in FIG. 12. The training data 1670 can include troubleshooting guides associated with various machine types other than the machine type of the particular machine 1690.

The AI 1660 can receive as input machine information 1610 including a machine model 1620, machine type 1630, environment, e.g. business, 1640 in which a machine operates, and an issue indicator 1650, such as a diagnostic code or a result of a performed testing step indicating the issue experienced by the machine. The machine can be a device, such as a vehicle, e.g., a heavy-duty vehicle, a computer, a chip, or any electronic device. For example, the machine can be a truck. The model 1620 can be an off-highway truck. The type 1630 can be a rigid frame or articulating frame. The business 1640 in which the machine operates can be forestry. The issue indicator 1650 can be that the engine oil temperature is high.

For example, the training data 1670 can include troubleshooting guides for on-highway trucks operating in construction but not for off-highway trucks operating in forestry. Despite the lack of guidance for fixing the off-highway trucks operating in forestry, the AI 1660, upon receiving the machine information 1610, can generate an output 1680 indicating a troubleshooting procedure to perform for the particular machine 1690.

In one embodiment, the AI 1660 can generate a troubleshooting procedure to perform. The AI 1660 can receive as input a result of the suggested troubleshooting procedure, and in response, the AI 1660 can suggest the next troubleshooting procedure to perform until the resolution of the issue is reached.

In another embodiment, the AI 1660 can generate a full troubleshooting graph or troubleshooting guide.

Figure 17:
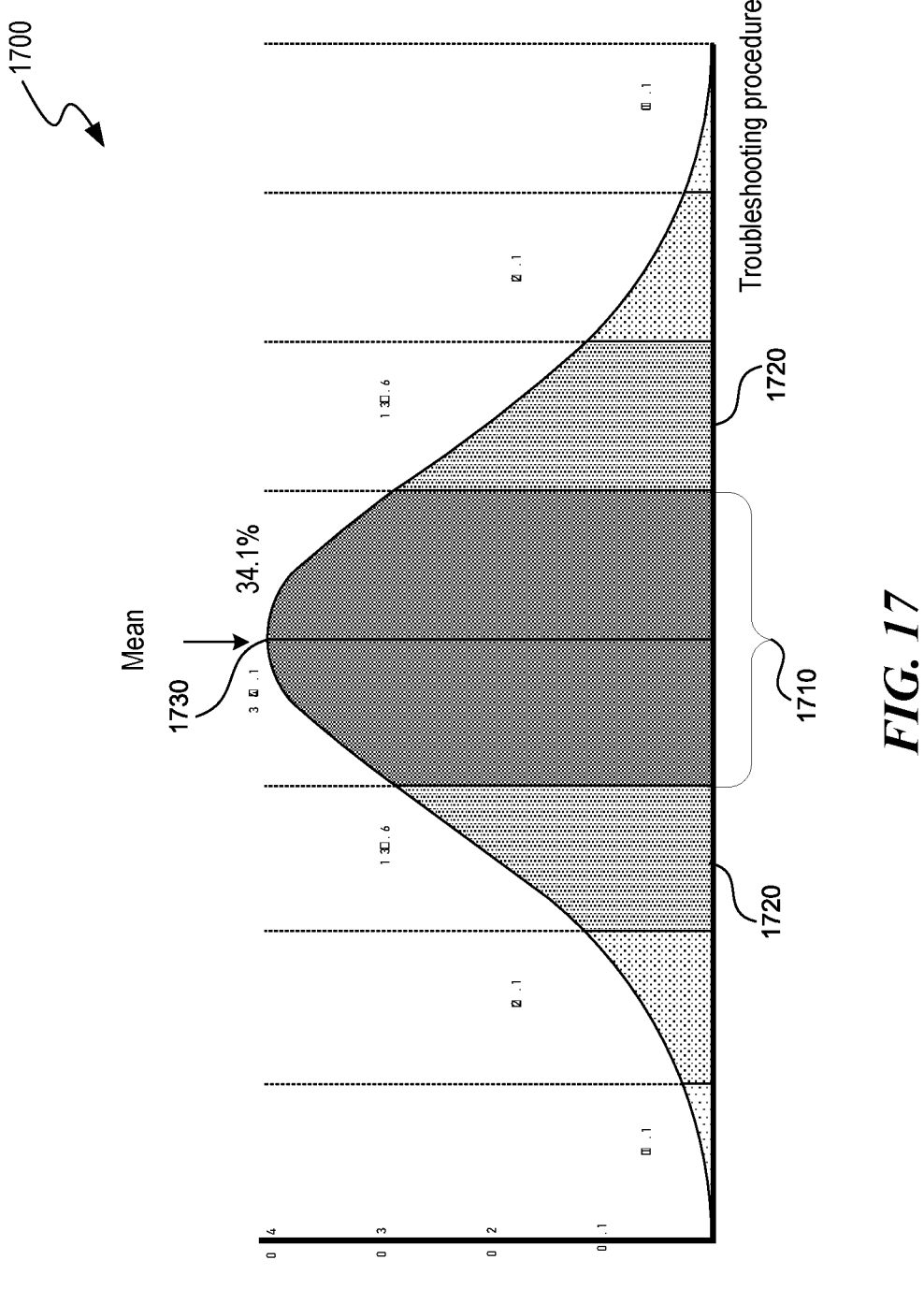
FIG. 17 shows a probability distribution used in generating a troubleshooting procedure or a guide.

FIG. 17 shows a probability distribution used in generating a troubleshooting procedure or a guide. The AI 1660 in FIG. 16 generates a probability distribution 1700, which indicates probabilities of various troubleshooting procedures. A troubleshooting procedure can be a testing step or a repair step, as explained in this application.

The AI 1660 can consider troubleshooting procedures that are within a threshold, such as one standard deviation 1710 or two standard deviations 1720 from the peak 1730. Alternatively, the threshold can be 95% probability. If there are multiple troubleshooting procedures that satisfy the threshold, the AI 1660 can suggest all the troubleshooting procedures that satisfy the threshold. In addition, or alternatively, the AI 1660 can include the suggested troubleshooting procedures when building a troubleshooting guide.

Figure 18:
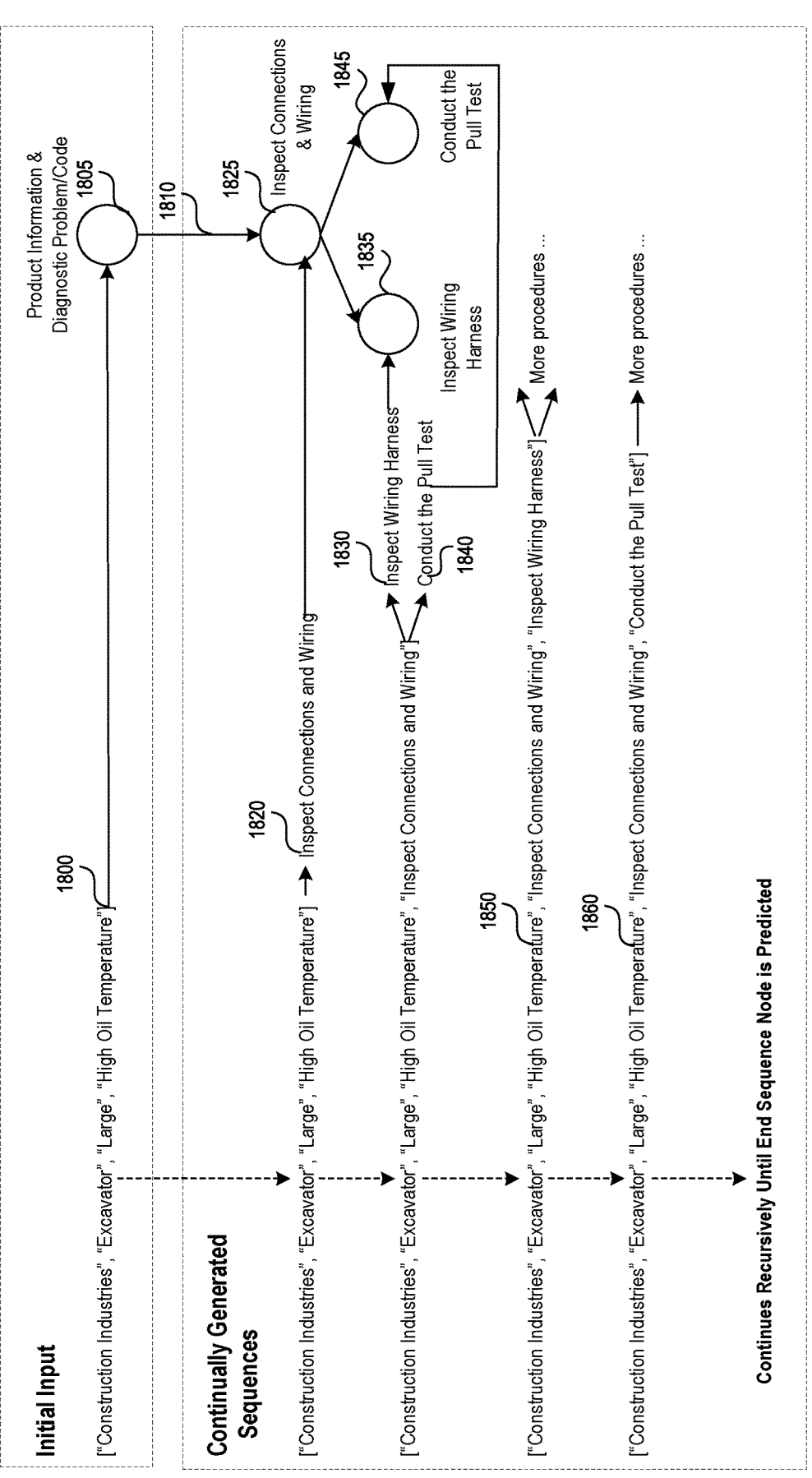
FIG. 18 shows a building of a troubleshooting guide or graph.

FIG. 18 shows a building of a troubleshooting guide or graph. The AI 1660 can receive the initial input 1800 indicating a business 1640 in FIG. 16 "construction industries," a machine model 1620 in FIG. 16 "excavator," a machine type 1630 in FIG. 16 "large," and an issue indicator 1650 in FIG. 16 "high oil temperature."

The AI 1660 can generate an initial node 1805 indicating the information received in the initial input 1800. Based on the initial input 1800, the AI 1660 can determine the most likely troubleshooting procedure 1820 that can lead to the issue resolution, such as "inspect connections and wiring." The AI can generate the node 1825 indicating the troubleshooting procedure 1820 and add the node to the troubleshooting guide 1810. The troubleshooting procedure 1820 is a testing step indicating to inspect connections and wiring.

An operator of the machine can perform the troubleshooting procedure 1820 and provide the result of the troubleshooting procedure to the AI 1660. Based on the result of the troubleshooting procedure 1820, the AI 1660 can determine the next most likely troubleshooting procedure 1830, 1840, such as "inspect wiring harness" and "conduct the pull test." In this case, there are two most likely troubleshooting procedures 1830, 1840 because, for example, both troubleshooting procedures can have a probability of solving the problem above a predetermined threshold, such as 95%. Consequently, the AI 1660 can create a branch in the troubleshooting guide 1810 by adding the nodes 1835, 1845 to the troubleshooting guide.

Based on the results of the troubleshooting procedures 1830, 1840, the AI 1660 can suggest additional troubleshooting procedures and add additional nodes to the troubleshooting guide 1810 in steps 1850, 1860. The above-described steps can be performed until a resolution of the issue is reached.

Figure 19:
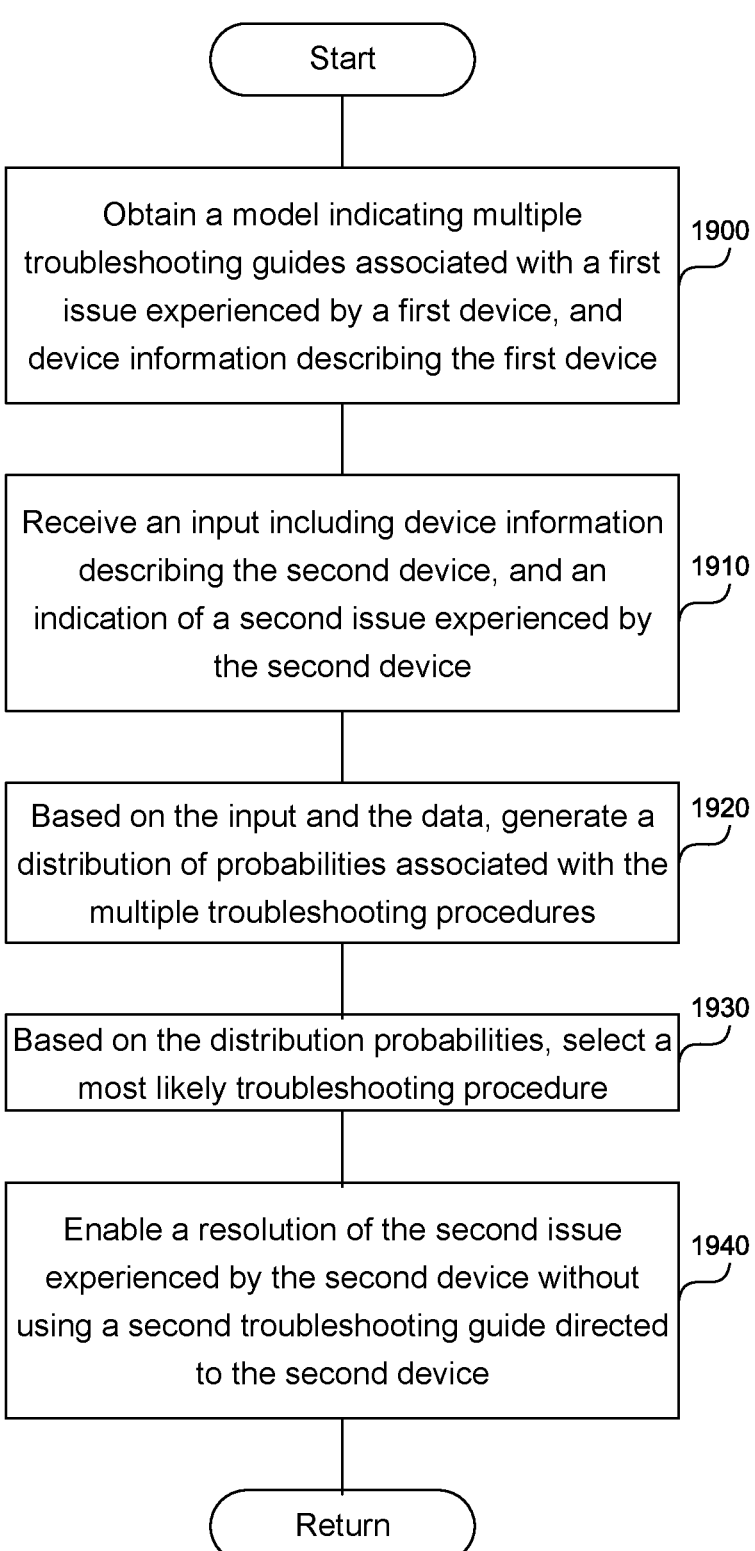
FIG. 19 is a flowchart of a method to resolve an issue experienced by a particular device without using a troubleshooting guide directed at the particular device.

FIG. 19 is a flowchart of a method to resolve an issue experienced by a particular device without using a troubleshooting guide directed at the particular device. A hardware or a software processor performing steps described in this application can, in step 1900, obtain an indication of multiple troubleshooting guides associated with a first issue experienced by a first device and device information describing the first device. The device information can include a first model associated with the first device, a first type associated with the first device, and a first business in which the first device is configured to operate.

The troubleshooting guide can include multiple troubleshooting procedures to perform. A troubleshooting procedure among the multiple troubleshooting procedures can include a testing step associated with the first issue and a repair step associated with the first issue.

In step 1910, the processor can receive an input including device information describing the second device and an indication of a second issue experienced by the second device. The second device can be the particular device experiencing the issue. The device information describing the second device can include a second model associated with the second device, a type associated with the second device, and a business in which the second device is configured to operate. The second device is different from the first device in the model, type, error code, and/or business.

In step 1920, based on the input and the indication of the multiple troubleshooting guides, the processor can generate a distribution of probabilities associated with the multiple troubleshooting procedures.

In step 1930, based on the distribution of probabilities, the processor can select a most likely troubleshooting procedure including a repair step associated with the second issue or the testing step associated with the second issue.

In step 1940, the processor can enable a resolution of the second issue experienced by the second device without using a second troubleshooting guide directed to the second device by suggesting the most likely troubleshooting procedure to perform as a resolution to the second issue experienced by the second device.

The processor can generate the second troubleshooting guide directed to the second device by performing the following steps. Initially, the processor can add, to the second troubleshooting guide, the indication of the second issue experienced by the second device and the most likely troubleshooting procedure. Next, the processor can receive a result of the most likely troubleshooting procedure to obtain a received result. Finally, the processor can perform the following sub-steps. First, based on the received result, the processor can generate a second distribution of probabilities associated with the multiple troubleshooting procedures. Second, the processor can select a second most likely troubleshooting procedure, where the second most likely troubleshooting procedure includes a repair step associated with the second issue or the testing step associated with the second issue. Third, the processor can add the second most likely troubleshooting procedure to the second troubleshooting guide. Finally, the processor can receive a result of the second most likely troubleshooting procedure to obtain the received result. The processor can repeat sub-steps one through four until the received result indicates that the second issue is resolved.

In addition, the processor can generate branches in the generated troubleshooting guide when two or more troubleshooting procedures satisfy the threshold. The processor can determine whether two or more probabilities associated with two or more troubleshooting procedures among the multiple troubleshooting procedures satisfy the probability threshold. Upon determining that the two or more troubleshooting procedures satisfy the probability threshold, the processor can create a branch in the second troubleshooting guide by adding the two or more troubleshooting procedures to perform to the second troubleshooting guide, where the two or more troubleshooting procedures include the most likely troubleshooting procedure or the second most likely troubleshooting procedure.

The processor can generate training data for an artificial intelligence using a second multiplicity of troubleshooting guides associated with multiple devices performing the following steps. First, the processor can extract from the second multiplicity of troubleshooting guides multiple paths leading to a repair step, where the multiple paths do not include multiple repair steps. Second, the processor can encode the multiple paths into multiple unique identifiers. Third, the processor can train the artificial intelligence using the multiple unique identifiers. The artificial intelligence can include a generative artificial intelligence such as an LSTM.

The processor can obtain a probability threshold. The processor can determine whether two or more probabilities associated with two or more troubleshooting procedures among the multiple troubleshooting procedures satisfy the probability threshold. Upon determining that the two or more troubleshooting procedures satisfy the probability threshold, the processor can suggest the two or more troubleshooting procedures to perform as a resolution to the second issue experienced by the second device.

The processor can receive a result of the most likely troubleshooting procedure from an operator and can determine whether the result indicates that the second issue is resolved. Upon determining that the result does not indicate that the second issue is resolved, based on the result, the processor can generate a second distribution of probabilities associated with the multiple troubleshooting procedures. The processor can select a second most likely troubleshooting procedure, where the second most likely troubleshooting procedure includes a repair step associated with the second issue or the testing step associated with the second issue. The processor can suggest the second most likely troubleshooting procedure to perform.

Figure 20:
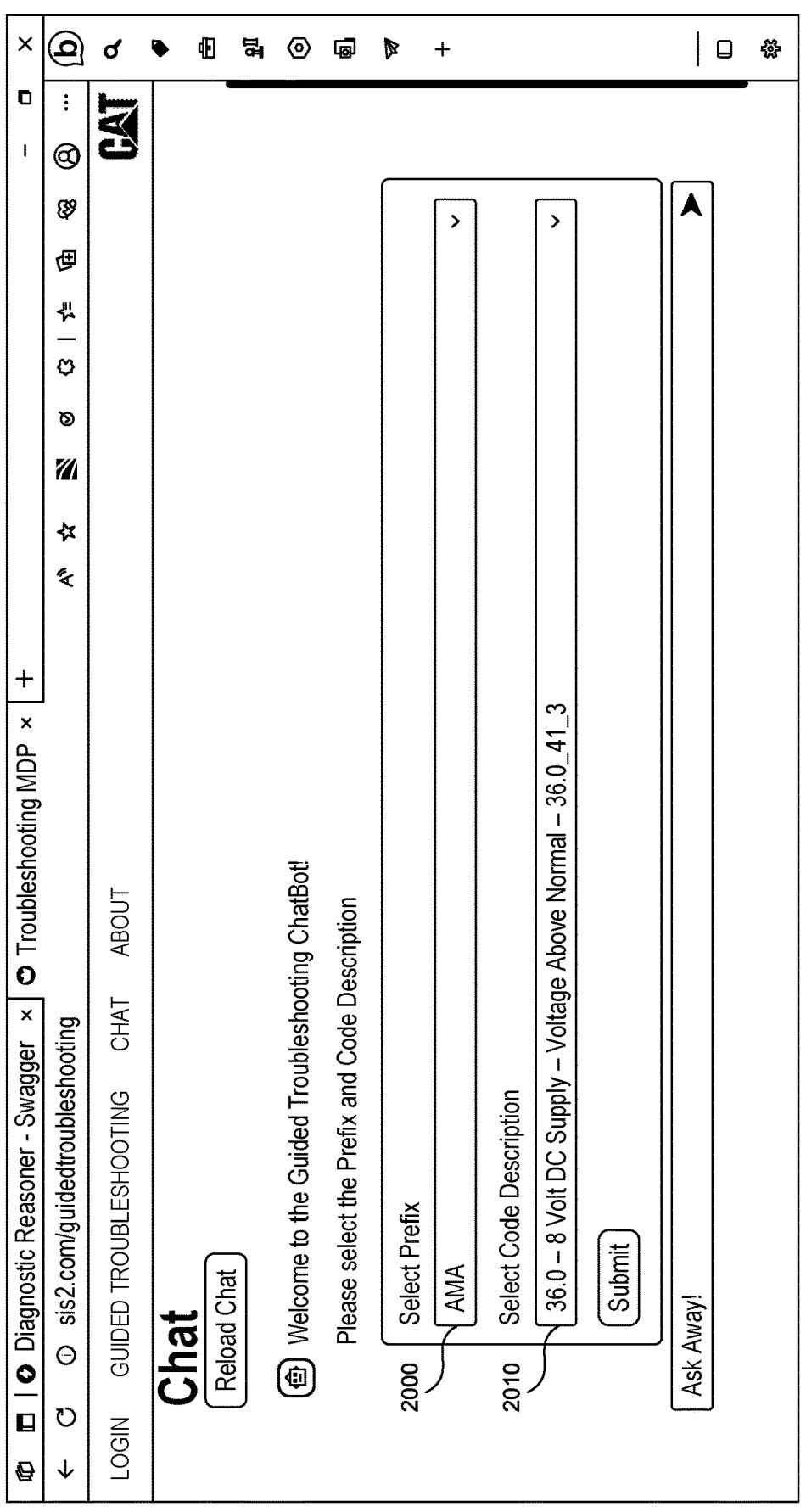
FIG. 20 shows an initial input into a natural language processing system such as a chatbot.

Resolving an Issue Experienced by a Particular Device Using Natural Language Input FIG. 20 shows an initial input into a natural language processing system such as a chatbot. The initial input includes a prefix 2000 indicating a machine and an indication of an issue 2010 with the machine code. The indication of the issue 2010 can be an error code such as 36.0_41_3, which can indicate that the voltage is above normal. The prefix 2000 uniquely identifies identical machines, of which there can be hundreds of thousands. Whenever there is an engineering change to the machine, the new machines receive a new prefix 2000.

Figure 21:
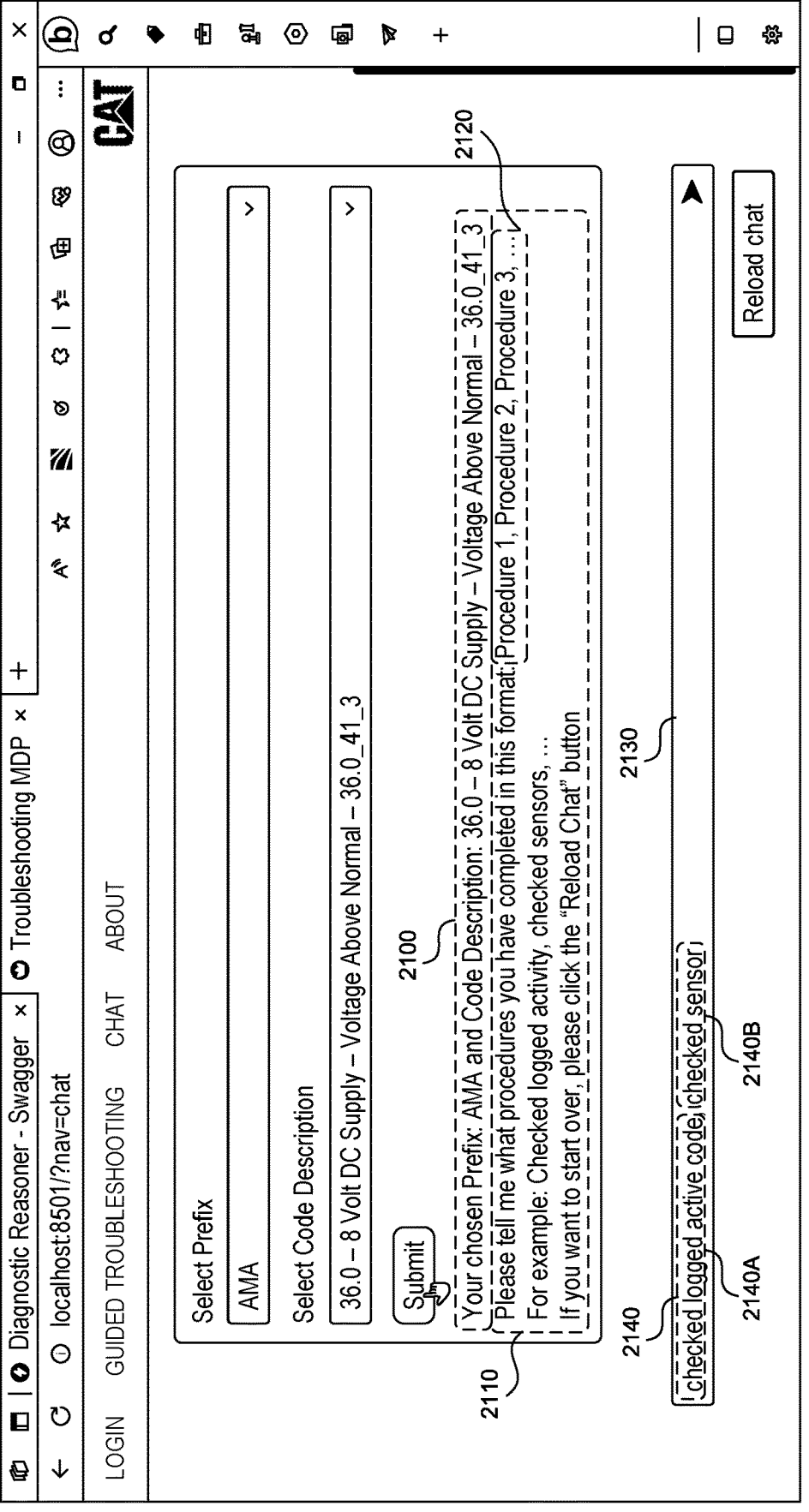
FIG. 21 shows a user interface to provide natural language input describing already performed procedures.

FIG. 21 shows a user interface to provide natural language input describing already performed procedures. Upon providing the prefix 2000 in FIG. 20 and the indication of an issue 2010 in FIG. 20, the system can reiterate the provided information in user interface element 2100 and can query the user via a user interface element 2110 to provide information about the procedures 2120 that the user has already performed. The procedures 2120 can be testing steps or unsuccessful repair steps.

The user interface element 2130 enables the user to enter natural language input 2140 describing the performed troubleshooting procedures 2140A, 2140B. The user interface element 2130 can utilize a particular format, such as a comma-separated list. The user interface element 2130 can also enable audio input. The natural language input 2140 includes two procedures performed, namely, "checked logged active code" 2140A and "checked sensor" 2140B.

Figure 22:
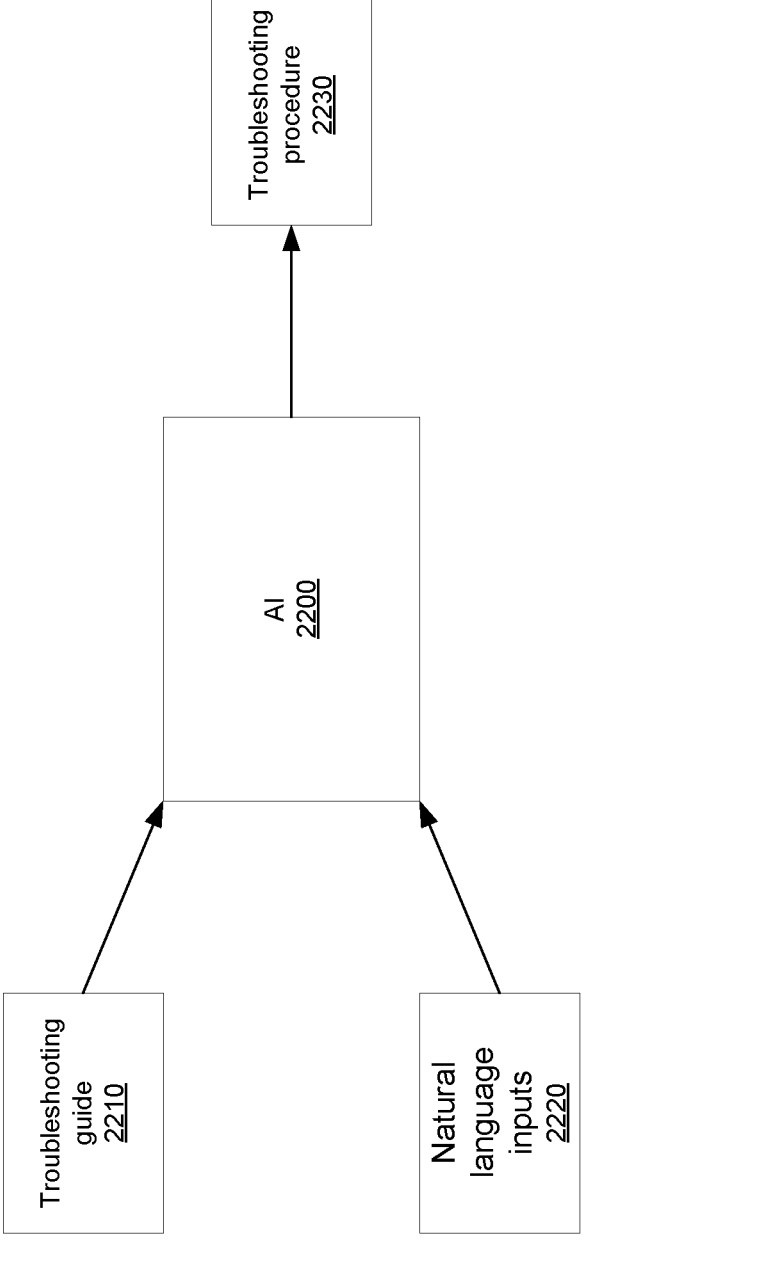
FIG. 22 shows an artificial intelligence trained to interpret the natural language input.

FIG. 22 shows an artificial intelligence trained to interpret the natural language input 2140 in FIG. 21. The artificial intelligence 2200 can be trained using multiple troubleshooting guides 2210 and multiple natural language inputs 2220. A troubleshooting guide among the multiple troubleshooting guides 2210 can include multiple troubleshooting procedures, such as a testing step or a repair step. One or more natural language inputs among the multiple natural language inputs 2220 can correspond to one troubleshooting procedure. In other words, a single troubleshooting procedure can be described using various natural language inputs.

Once trained, the artificial intelligence 2200 can receive as input 2140 in FIG. 21, can map the input into the troubleshooting procedure 2230, and can provide the troubleshooting procedure 2230 as output.

Figure 23A:
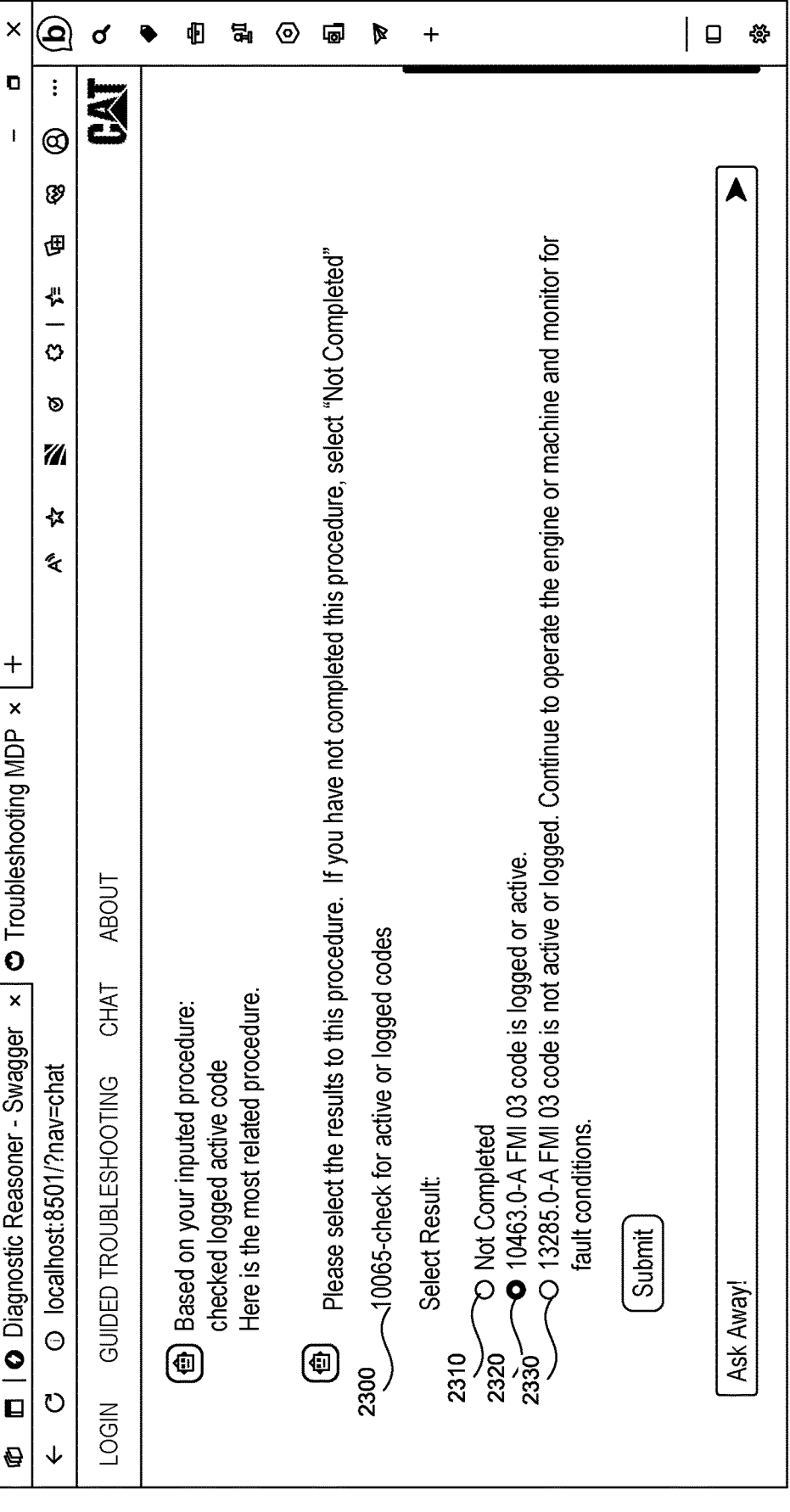
FIG. 23A shows the troubleshooting procedure corresponding to one natural language input.

FIG. 23A shows the troubleshooting procedure 2300 corresponding to one natural language input 2140A in FIG. 21. The artificial intelligence 2200 in FIG. 22 can map the natural language input "checked log active code" 2140A to the troubleshooting procedure 2300 "10065-check for active or logged codes."

In addition to the troubleshooting procedure 2300, the system can present possible results 2310, 2320, 2330 obtained from performing the troubleshooting procedure and can ask the operator to select one of the results, such as results 2320, namely, "10463.0-A FMI 03 code is logged or active." By selecting results 2310 "not completed," an operator can indicate to the system that the identification of the troubleshooting procedure 2300 is incorrect.

Figure 23B:
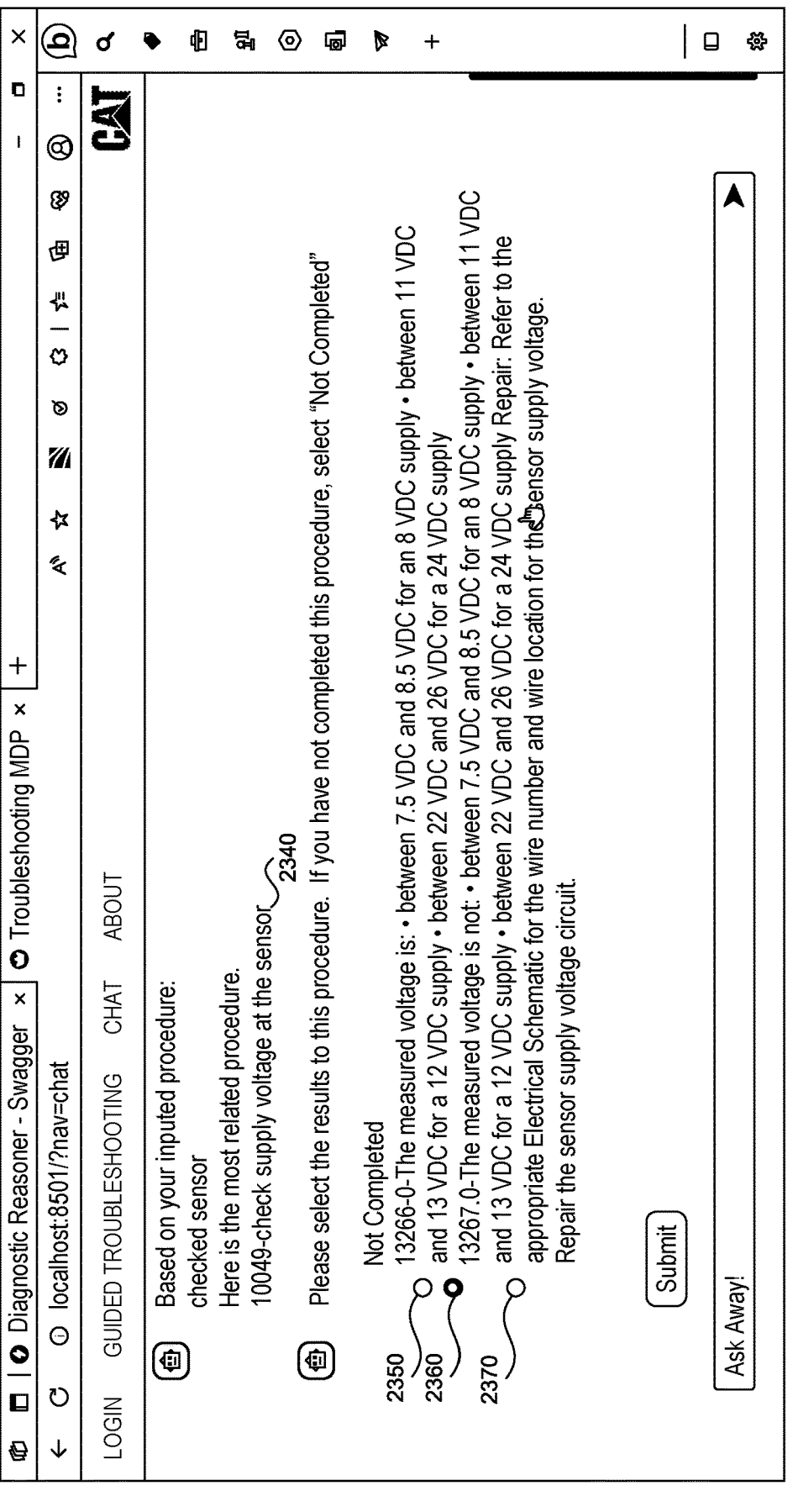
FIG. 23B shows the troubleshooting procedure corresponding to another natural language input.

FIG. 23B shows the troubleshooting procedure 2340 corresponding to another natural language input, namely, 2140B in FIG. 21. Since the user has input two troubleshooting procedures 2140A, 2140B, the system takes each of the procedures in turn, e.g., sequentially. The artificial intelligence 2200 in FIG. 22 can map the natural language input "checked sensor" 2140B into the troubleshooting procedure 2340 "10049-check supply voltage at the sensor."

In addition to the troubleshooting procedure 2340, the system can present possible results 2350, 2360, 2370 obtained from performing the troubleshooting procedure and can ask the operator to select one of the results, such as result 2360, namely:

"13267.0—The measured voltage is not:
    between 7.5 VDC and 8.5 VDC for an 8 VDC supply
    between 11 VDC and 13 VDC for a 12 VDC supply
    between 22 VDC and 26 VDC for a 24 VDC supply."

Figure 24A:
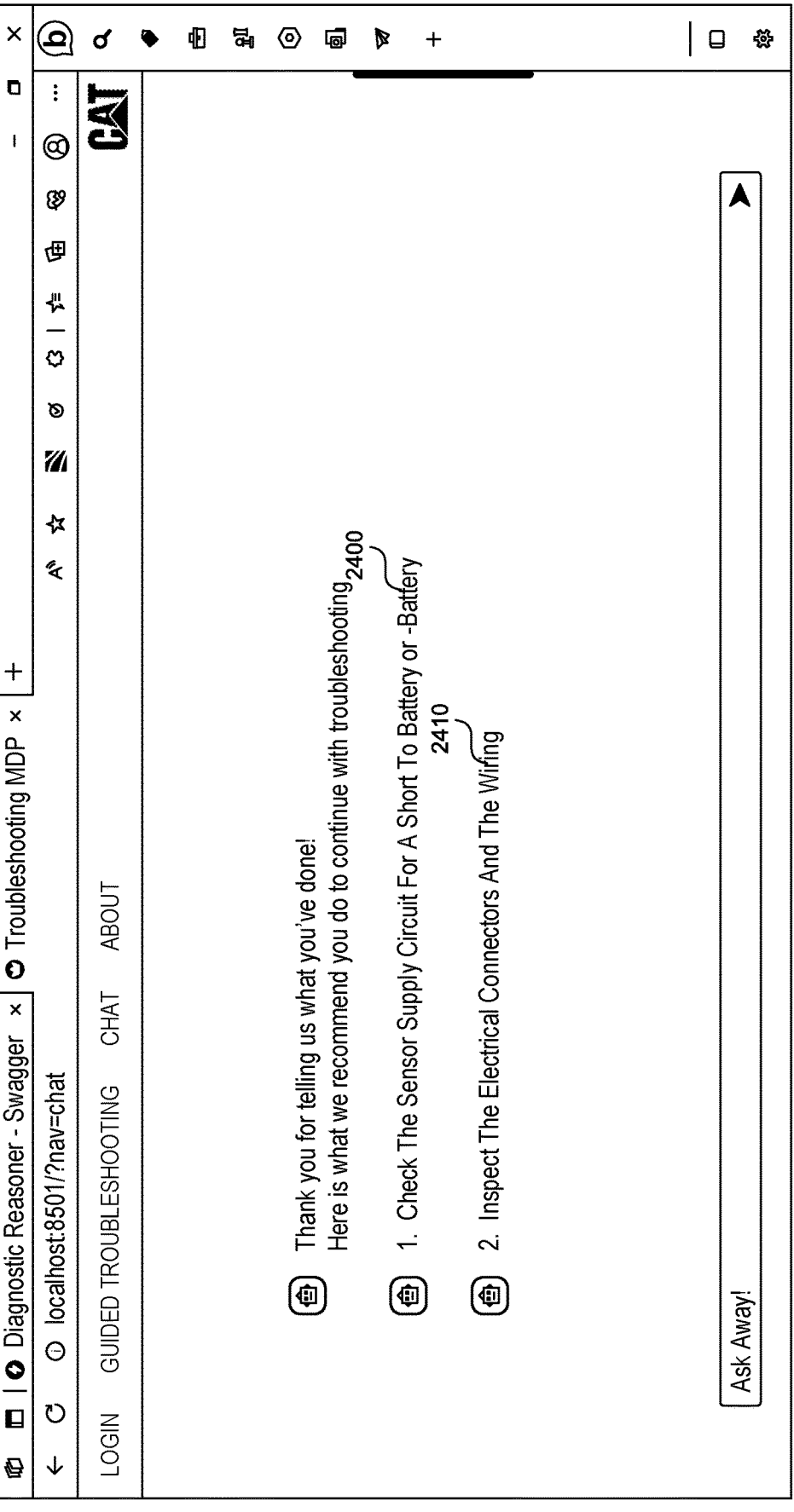
FIGS. 24A-24B show suggested troubleshooting procedures.
Figure 24B:
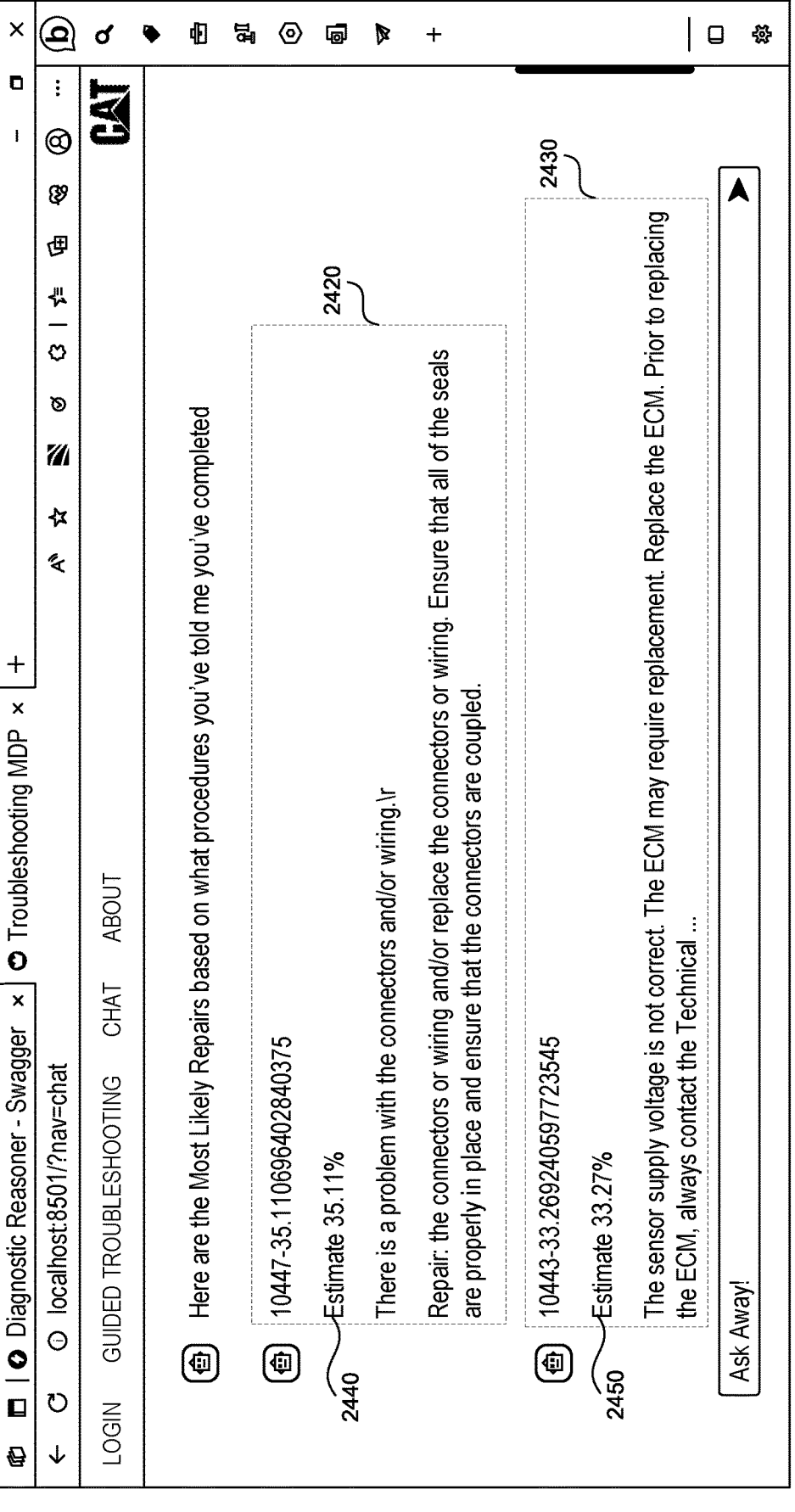

FIGS. 24A-24B show suggested troubleshooting procedures. Based on the troubleshooting procedures 2300, 2340, in FIGS. 23A-23B and the results 2320, 2360 in FIGS. 23A-23B, the system can produce several suggested troubleshooting procedures 2400, 2410, 2420, 2430. The troubleshooting procedures 2400, 2410 are testing steps indicating what further tests to perform on the device experiencing the issue using technology described in this application. The troubleshooting procedures 2420, 2430 indicate the most likely repairs along with the probabilities 2440, 2450 that the repair will be successful.

The suggested troubleshooting procedures 2400, 2410, 2420, 2430 are different from the already performed procedures 2300, 2340 in FIGS. 23A-23B. In effect, the natural language input 2140 in FIG. 21 enables the operator to indicate to the system which troubleshooting procedures have been performed so that the system does not suggest the same troubleshooting procedures again. In other words, the natural language input 2140 enables the user to indicate a different starting point from node 4 in the graph 800 in FIG. 8A or a different starting point in graph 1100 in FIG. 11.

The natural image processing system can act as an interface to the various system components including next step prediction service 222 in FIG. 2 and a result prediction service 224 in FIG. 2. Consequently, the suggested troubleshooting procedures 2400, 2410, 2420, 2430 can include suggested testing steps or suggested repair steps.

In addition, the processor can request, from the operator, feedback on the accuracy of the suggested troubleshooting procedures. The system can take the feedback into account when suggesting troubleshooting procedures in the future.

Figure 25:
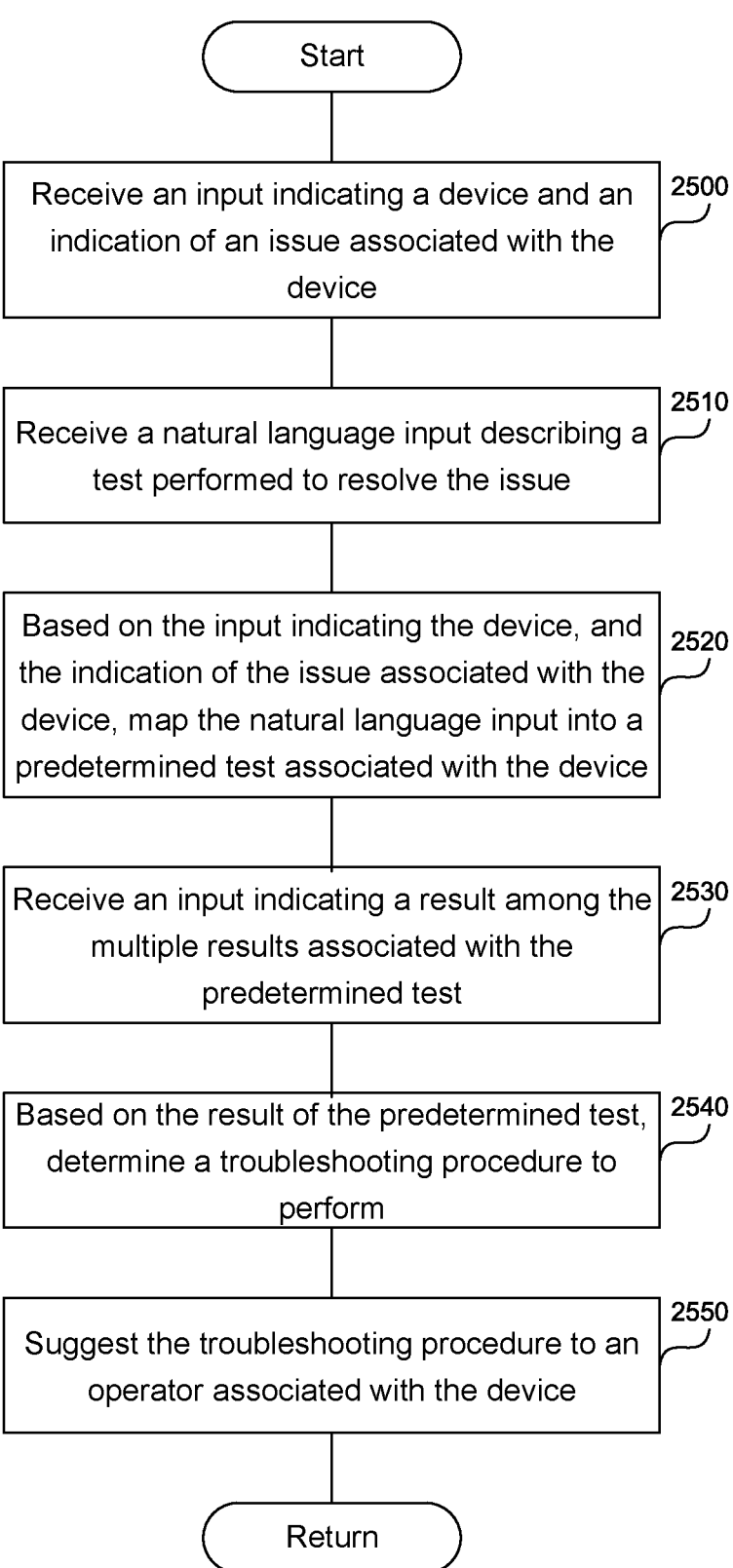
FIG. 25 is a flowchart of a method to resolve an issue experienced by a particular device using natural language input.

FIG. 25 is a flowchart of a method to resolve an issue experienced by a particular device using natural language input. A hardware or software processor executing instructions describing this application can, in step 2500, receive an input indicating a device and an indication of an issue associated with the device.

In step 2510, the processor can receive a natural language input describing a troubleshooting procedure performed to resolve the issue.

In step 2520, based on the input indicating the device, and the indication of the issue associated with the device, the processor can map the natural language input into a predetermined troubleshooting procedure associated with the device. The processor can provide the predetermined troubleshooting procedure and multiple results associated with the predetermined troubleshooting procedure.

In step 2530, the processor can receive an input indicating a result among the multiple results associated with the predetermined troubleshooting procedure.

In step 2540, based on the result of the predetermined troubleshooting procedure, the processor can determine a troubleshooting procedure to perform, which can include a repair step associated with the issue or a testing step associated with the issue. The troubleshooting procedure is different from the troubleshooting procedure performed to resolve the issue.

In step 2550, the processor can suggest the troubleshooting procedure to an operator associated with the device.

To map the natural language input into the predetermined troubleshooting procedure, the processor can provide the natural language input to an artificial intelligence configured to establish a correspondence between the natural language input and the predetermined troubleshooting procedure associated with the device among multiple predetermined troubleshooting procedures associated with the device. The processor can obtain the predetermined troubleshooting procedure from the artificial intelligence.

The processor can train the artificial intelligence. To train the artificial intelligence, the processor can obtain a troubleshooting guide including multiple troubleshooting procedures to perform. A troubleshooting procedure among the multiple troubleshooting procedures can include a testing step associated with the first issue and a repair step associated with the first issue. The processor can obtain multiple natural language inputs describing the multiple troubleshooting procedures, where a natural language input among the multiple natural language inputs describes one or more troubleshooting procedures among the multiple troubleshooting procedures. The processor can train an artificial intelligence using the troubleshooting guide and the multiple natural language inputs to map the natural language input into the predetermined troubleshooting procedure associated with the device.

The processor can simultaneously receive an indication of multiple tests performed. Specifically, the processor can receive multiple natural language inputs, including natural language input describing multiple tests performed to resolve the issue including the test performed. Based on the input indicating the device, and the indication of the issue associated with the device, the processor can map the multiple natural language inputs into multiple predetermined troubleshooting procedures associated with the device. For each predetermined troubleshooting procedure among the multiple predetermined troubleshooting procedures, the processor can sequentially query the operator to provide multiple inputs indicating multiple results associated with performing the multiple predetermined troubleshooting procedures. Based on the multiple results associated with performing the multiple predetermined troubleshooting procedures, the processor can determine the troubleshooting procedure to perform.

The processor can ask the operator for feedback. The processor can request feedback from the operator indicating whether the suggested troubleshooting procedure is helpful. The processor can receive the feedback from the operator, and based on the result of the feedback, determine a second troubleshooting procedure to perform. For example, the processor can train an artificial intelligence based on the user feedback.

To determine the troubleshooting procedure to perform based on the input, the processor can obtain multiple graphs applicable to the one or more issues associated with the device, where a graph among the multiple graphs can represent multiple troubleshooting procedures. A node in the graph can represent a troubleshooting procedure among the multiple troubleshooting procedures, and an edge can represent a sequential relationship between two troubleshooting procedures among the multiple troubleshooting procedures. The troubleshooting procedure among the multiple troubleshooting procedures can indicate a test to perform or a repair step. The processor can obtain multiple historical success rates associated with the multiple graphs. The processor can calculate a first multiplicity of scores associated with the multiple graphs based on the multiple historical success rates. Based on the first multiplicity of scores, the processor can suggest the troubleshooting procedure among the multiple troubleshooting procedures to perform, where the first troubleshooting procedure is represented by the node in the graph.

The processor can provide to an artificial intelligence the indication of the issue associated with the device. The processor can obtain from an artificial intelligence an indication of a most likely repair step to resolve the issue without requiring performance of the testing step. The artificial intelligence can be trained by the following steps. First, the processor can obtain a first graph representing a troubleshooting guide associated with a first issue experienced by a device, where the first graph includes a first multiplicity of nodes and a first multiplicity of edges, where a node among the first multiplicity of nodes indicates a troubleshooting procedure and an edge among the first multiplicity of edges indicates a result associated with the troubleshooting procedure, and where the result associated with the troubleshooting procedure indicates a testing step or a repair step. Second, the processor can determine a subset of the first multiplicity of edges associated with the repair step. Third, the processor can convert the subset of the first multiplicity of edges into multiple repair nodes to obtain a second graph including a second multiplicity of nodes and a second multiplicity of edges, where a repair node among the multiple repair nodes indicates the repair step resolving the first issue experienced by the device, where the second multiplicity of nodes includes the first multiplicity of nodes and the multiple repair nodes, and where an edge among the second multiplicity of edges represents a relationship between two nodes in the second multiplicity of nodes. Fourth, the processor can train the artificial intelligence using the second graph.

INDUSTRIAL APPLICABILITY

The disclosed system streamlines and customizes a user's troubleshooting workflow so that the user does not spend time performing unnecessary steps and reading irrelevant voluminous troubleshooting documentation. The system enables the user to interact with the system through natural language, voice, text, touch, and click interfaces. The system uses artificial intelligence and machine learning to provide suggestions on which tests to perform to diagnose the issue and which repair steps to perform to fix the issue. The system can learn from multiple users' actions and experiences, and/or based on the learning, the system can recommend the most relevant test and/or repair.

The system obtains a graph A representing a troubleshooting guide associated with issue A experienced by a machine, where the graph A includes a multiplicity of nodes A and a multiplicity of edges A. A node among the multiplicity of nodes A indicates a troubleshooting procedure, and an edge among the multiplicity of edges A indicates a result associated with the troubleshooting procedure, where the result associated with the troubleshooting procedure indicates a testing step or a repair step.

The system determines a subset of the multiplicity of edges A associated with the repair step and converts the subset of the multiplicity of edges A into multiple repair nodes to obtain a graph B including a multiplicity of nodes B and a multiplicity of edges B. A repair node among the multiple repair nodes indicates the repair step resolving the issue experienced by the machine. The multiplicity of nodes B includes the multiplicity of nodes A and the multiple repair nodes. The edge among the multiplicity of edges B represents a relationship between two nodes in the multiplicity of nodes B. Based on the graph B, the system trains an artificial intelligence to receive an indication of issue B experienced by the machine and to provide a most likely repair step to resolve the issue B without requiring performance of the testing step. By providing the most likely repair step, and not asking an operator to perform multiple tasks to resolve the issue, the artificial intelligence can save a lot of time in performing the repair.

Computer System

Figure 26:
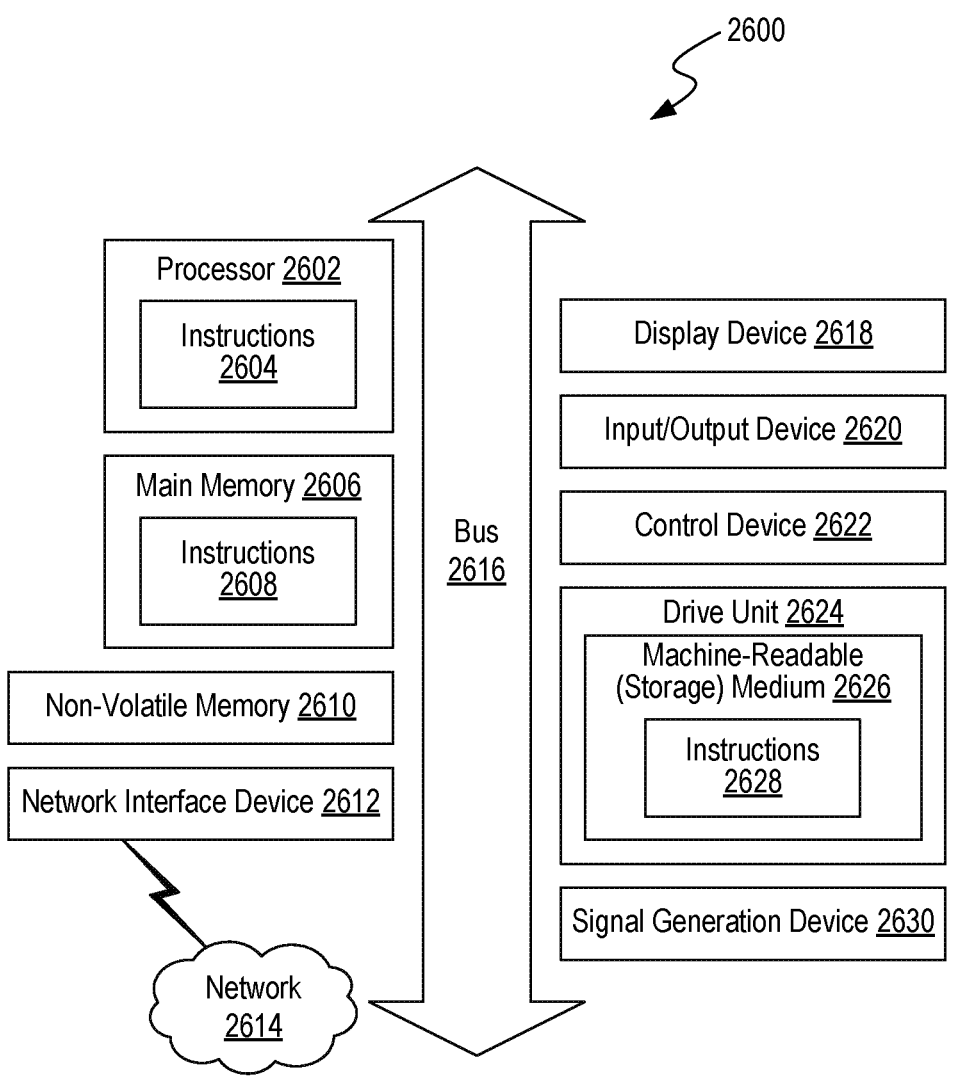
FIG. 26 is a block diagram that illustrates an example of a computer system in which at least some operations described herein can be implemented.

FIG. 26 is a block diagram that illustrates an example of a computer system 2600 in which at least some operations described herein can be implemented. As shown, the computer system 2600 can include: one or more processors 2602, main memory 2606, non-volatile memory 2610, a network interface device 2612, a display device 2618, an input/output device 2620, a control device 2622 (e.g., keyboard and pointing device), a drive unit 2624 that includes a storage medium 2626, and a signal generation device 2630 that are communicatively connected to a bus 2616. The bus 2616 represents one or more physical buses and/or point-to-point connections that are connected by appropriate bridges, adapters, or controllers. Various common components (e.g., cache memory) are omitted from FIG. 26 for brevity. Instead, the computer system 2600 is intended to illustrate a hardware device on which components illustrated or described relative to the examples of the Figures and any other components described in this specification can be implemented.

The computer system 2600 can take any suitable physical form. For example, the computer system 2600 can share a similar architecture as that of a server computer, personal computer (PC), tablet computer, mobile telephone, game console, music player, wearable electronic device, network-connected ("smart") device (e.g., a television or home assistant device), augmented reality/virtual reality (AR/VR) systems (e.g., head-mounted display), or any electronic device capable of executing a set of instructions that specify action(s) to be taken by the computer system 2600. In some implementations, the computer system 2600 can be an embedded computer system, a system-on-chip (SOC), a single-board computer system (SBC), or a distributed system such as a mesh of computer systems or can include one or more cloud components in one or more networks. Where appropriate, one or more computer systems 2600 can perform operations in real time, in near real time, or in batch mode.

The network interface device 2612 enables the computer system 2600 to mediate data in a network 2614 with an entity that is external to the computer system 2600 through any communication protocol supported by the computer system 2600 and the external entity. Examples of the network interface device 2612 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 2606, non-volatile memory 2610, machine-readable medium 2626) can be local, remote, or distributed. Although shown as a single medium, the machine-readable medium 2626 can include multiple media (e.g., a centralized/distributed database and/or associated caches and servers) that store one or more sets of instructions 2628. The machine-readable (storage) medium 2626 can include any medium that is capable of storing, encoding, or carrying a set of instructions for execution by the computer system 2600. The machine-readable medium 2626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 2610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 2604, 2608, 2628) set at various times in various memory and storage devices in computing device(s). When read and executed by the processor 2602, the instruction(s) cause the computer system 2600 to perform operations to execute elements involving the various aspects of the disclosure.

REMARKS

The terms "multiplicity" and "plurality" are used interchangeably in this specification. Further, the terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not f other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties except for any subject matter disclaimers or disavowals and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms in either this application or in a continuing application.

We claim:

1. A non-transitory, computer-readable storage medium storing instructions, which, when executed by at least one data processor of a system, cause the system to:

obtain a first graph representing a troubleshooting guide associated with a first issue experienced by a vehicle designed to execute construction tasks, wherein the first graph includes a first plurality of nodes and a first plurality of edges, wherein a node among the first plurality of nodes indicates a troubleshooting procedure, and an edge among the first plurality of edges indicates a result associated with the troubleshooting procedure, wherein the result associated with the troubleshooting procedure indicates a testing step or a repair step;

determine a subset of the first plurality of edges associated with the repair step;

convert the subset of the first plurality of edges into multiple repair nodes to obtain a second graph including a second plurality of nodes and a second plurality of edges, wherein a repair node among the multiple repair nodes indicates the repair step resolving the first issue experienced by the vehicle designed to execute construction tasks, wherein the second plurality of nodes includes the first plurality of nodes and the multiple repair nodes, wherein an edge among the second plurality of edges represents a relationship between two nodes in the second plurality of nodes;

based on the second graph, train an artificial intelligence, wherein the artificial intelligence is configured to receive an indication of a second issue experienced by the vehicle designed to execute construction tasks, and to provide an indication of a most likely repair step to resolve the second issue without requiring performance of the testing step;

measure, by a sensor associated with a second vehicle designed to execute constriction tasks, an indication of a third data indicating a third error associated with the second vehicle designed to execute construction tasks;

provide, by the sensor associated with the second vehicle designed to execute construction tasks, to the artificial intelligence the third data indicating the third error associated with the second vehicle designed to execute construction tasks; and enable an efficient repair of the third data indicating the third error associated with the second vehicle designed to execute construction tasks by:

providing the indication of the third data indicating the third error to the artificial intelligence; and obtaining from the artificial intelligence a predicted value indicating the repair step most likely to resolve the third data indicating the third error, wherein the repair step is most likely to resolve the third data indicating the third error independent of the testing step.

2. The non-transitory, computer-readable storage medium of claim 1, comprising instructions to:

convert the subset of the first plurality of edges into the multiple repair nodes to obtain the second graph including the second plurality of nodes and the second plurality of edges, wherein the second graph includes an end node, wherein reaching the end node indicates that the first issue has been resolved;

extract, from the second graph, multiple paths through the second graph leading to the repair node, wherein the multiple paths do not include a second repair node or the end node;

encode the multiple paths into multiple unique identifiers; and train the artificial intelligence using the multiple unique identifiers.

3. The non-transitory, computer-readable storage medium of claim 1, comprising instructions to:

obtain multiple paths through the second graph leading to the repair node, wherein a path among the multiple paths does not include a second repair node; and encode the multiple paths into multiple unique identifiers to generate training data for the artificial intelligence.

4. The non-transitory, computer-readable storage medium of claim 1, comprising instructions to:

receive an indication of a third issue associated with the second vehicle designed to execute construction tasks;

provide the indication of the third issue to the artificial intelligence; and enable efficient repair of the third issue associated with the second vehicle designed to execute construction tasks by obtaining from the artificial intelligence the indication of the most likely repair step to resolve the third issue without requiring the performance of the testing step.

5. The non-transitory, computer-readable storage medium of claim 1, comprising instructions to:

convert the subset of the first plurality of edges into the multiple repair nodes to obtain the second graph including the second plurality of nodes and the second plurality of edges; and generate training data for the artificial intelligence by extracting, from the second graph, multiple paths through the second graph leading to the repair node, wherein a path among the multiple paths does not include a second repair node.

6. The non-transitory, computer-readable storage medium of claim 1, comprising instructions to:
generate, by the artificial intelligence, an indication of the repair step and a time associated with performing the repair step,
wherein the time associated with performing the repair step is less than a time associated with performing the testing step and a second repair step.

7. The non-transitory, computer-readable storage medium of claim 1, comprising instructions to:
convert the subset of the first plurality of edges into the multiple repair nodes to obtain the second graph including the second plurality of nodes and the second plurality of edges,
wherein one edge among the subset of the first plurality of edges corresponds to one repair node among the multiple repair nodes.

8. A method comprising:
obtaining a first representation of a troubleshooting guide associated with a first issue experienced by a first device,
wherein the first representation includes a first plurality of nodes and a first plurality of edges,
wherein a node among the first plurality of nodes indicates a troubleshooting procedure, and an edge among the first plurality of edges indicates a result associated with the troubleshooting procedure,
wherein the result associated with the troubleshooting procedure indicates a testing step or a repair step;
determining a subset of the first plurality of edges associated with the repair step;
converting the subset of the first plurality of edges into multiple repair nodes to obtain a second representation including a second plurality of nodes and a second plurality of edges,
wherein a repair node among the multiple repair nodes indicates the repair step resolving the first issue experienced by the first device,
wherein the second plurality of nodes includes the first plurality of nodes and the multiple repair nodes,
wherein an edge among the second plurality of edges represents a relationship between two nodes in the second plurality of nodes;
based on the second representation, training an artificial intelligence,
wherein the artificial intelligence is configured to receive an indication of a second issue experienced by a second device, and to provide a most likely repair step to resolve the second issue without requiring performance of the testing step;
measuring, by a sensor associated with a second vehicle designed to execute construction tasks, an indication of a third data indicating a third error associated with the second vehicle designed to execute construction tasks;
providing, by the sensor associated with the second vehicle designed to execute construction tasks, to the artificial intelligence the third data indicating the third error associated with the second vehicle designed to execute construction tasks; and
causing an efficient repair of the third data indicating the third error associated with the second vehicle designed to execute construction tasks by:
providing the indication of the third data indicating the third error to the artificial intelligence; and obtaining from the artificial intelligence a predicted value indicating the repair step most likely to resolve the third data indicating the third error, wherein the repair step is most likely to resolve the third data indicating the third error independent of the testing step.

9. The method of claim 8, comprising:
converting the subset of the first plurality of edges into the multiple repair nodes to obtain the second representation including the second plurality of nodes and the second plurality of edges,
wherein the second representation includes an end node,
wherein reaching the end node indicates that the first issue has been resolved;
extracting, from the second representation, multiple paths through the second representation leading to a repair node,
wherein the multiple paths do not include a second repair node or the end node;
encoding the multiple paths into multiple unique identifiers; and
training the artificial intelligence using the multiple unique identifiers.

10. The method of claim 8, comprising:
obtaining multiple paths through the second representation leading to the repair node,
wherein a path among the multiple paths does not include a second repair node; and
causing encoding the multiple paths into multiple unique identifiers to generate training data for the artificial intelligence.

11. The method of claim 8, comprising:
receiving an indication of the second issue associated with the second device;
providing the indication of the second issue to the artificial intelligence; and
causing efficient repair of the second issue associated with the second device by obtaining from the artificial intelligence the indication of the most likely repair step to resolve the second issue without requiring the performance of the testing step.

12. The method of claim 8, comprising:
converting the subset of the first plurality of edges into the multiple repair nodes to obtain the second representation including the second plurality of nodes and the second plurality of edges; and
generating training data for the artificial intelligence by extracting, from the second representation, multiple paths through the second representation leading to a repair node, wherein a path among the multiple paths does not include a second repair node.

13. The method of claim 8, comprising:
generating, by the artificial intelligence, an indication of the repair step and a time associated with performing the repair step,
wherein the time associated with performing the repair step is less than a time associated with performing the testing step and a second repair step.

14. A system comprising:
at least one hardware processor; and
at least one non-transitory memory storing instructions, which, when executed by the at least one hardware processor, cause the system to:
obtain a first representation of a troubleshooting guide associated with a first issue experienced by a first device, wherein the first representation includes a first plurality of nodes and a first plurality of edges, wherein a node among the first plurality of nodes indicates a troubleshooting procedure, and an edge among the first plurality of edges indicates a result associated with the troubleshooting procedure, wherein the result associated with the troubleshooting procedure indicates a testing step or a repair step;

determine a subset of the first plurality of edges associated with the repair step;

convert the subset of the first plurality of edges into multiple repair nodes to obtain a second representation including a second plurality of nodes and a second plurality of edges, wherein a repair node among the multiple repair nodes indicates the repair step resolving the first issue experienced by the first device, wherein the second plurality of nodes includes the first plurality of nodes and the multiple repair nodes, wherein an edge among the second plurality of edges represents a relationship between two nodes in the second plurality of nodes; and based on the second representation, train an artificial intelligence, wherein the artificial intelligence is configured to receive an indication of a second issue experienced by a second device, and to provide a most likely repair step to resolve the second issue without requiring performance of the testing step;

a sensor associated with a second vehicle designed to execute construction tasks, the sensor configured to:

measure an indication of a third data indicating a third error associated with the second vehicle designed to execute construction tasks; and provide to the artificial intelligence the third data indicating the third error associated with the second vehicle designed to execute construction tasks; and the at least one non-transitory memory storing instructions, which, when executed by the at least one hardware processor, cause the system to:

enable an efficient repair of the third data indicating the third error associated with the second vehicle designed to execute construction tasks by:

providing the indication of the third data indicating the third error to the artificial intelligence; and obtaining from the artificial intelligence a predicted value indicating the repair step most likely to resolve the third data indicating the third error, wherein the repair step is most likely to resolve the third data indicating the third error independent of the testing step.

15. The system of claim 14, comprising instructions to:

convert the subset of the first plurality of edges into the multiple repair nodes to obtain the second representation including the second plurality of nodes and the second plurality of edges, wherein the second representation includes an end node, wherein reaching the end node indicates that the first issue has been resolved;

extract, from the second representation, multiple paths through the second representation leading to a repair node, wherein the multiple paths do not include a second repair node or the end node;

encode the multiple paths into multiple unique identifiers; and train the artificial intelligence using the multiple unique identifiers.

16. The system of claim 14, comprising instructions to:

obtain multiple paths through the second representation leading to the repair node, wherein a path among the multiple paths does not include a second repair node; and encode the multiple paths into multiple unique identifiers to generate training data for the artificial intelligence.

17. The system of claim 14, comprising instructions to:

receive the indication of the second issue associated with the second device;

provide the indication of the second issue to the artificial intelligence; and enable efficient repair of the second issue associated with the second device by obtaining from the artificial intelligence the indication of the most likely repair step to resolve the second issue without requiring the performance of the testing step.

18. The system of claim 14, comprising instructions to:

convert the subset of the first plurality of edges into the multiple repair nodes to obtain the second representation including the second plurality of nodes and the second plurality of edges; and generate training data for the artificial intelligence by extracting, from the second representation, multiple paths through the second representation leading to a repair node, wherein a path among the multiple paths does not include a second repair node.

19. The system of claim 14, comprising instructions to:

generate, by the artificial intelligence, an indication of the repair step and a time associated with performing the repair step, wherein the time associated with performing the repair step is less than a time needed to perform the testing step and a second repair step.

20. The system of claim 14, comprising instructions to:

convert the subset of the first plurality of edges into the multiple repair nodes to obtain the second representation including the second plurality of nodes and the second plurality of edges, wherein one edge among the subset of the first plurality of edges corresponds to one repair node among the multiple repair nodes.

* * * * *